(12) United States Patent
Suzuki et al.

(10) Patent No.: US 10,126,733 B2
(45) Date of Patent: Nov. 13, 2018

(54) CONTROL STATION, SLAVE STATION, CONTROL METHOD OF CONTROL STATION, AND CONTROL METHOD OF SLAVE STATION

(71) Applicant: Kabushiki Kaisha Toshiba, Tokyo (JP)

(72) Inventors: Chiharu Suzuki, Kanagawa (JP); Masahiro Takagaki, Tokyo (JP); Junya Soeda, Kanagawa (JP); Masaru Munemoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 193 days.

(21) Appl. No.: 15/238,257

(22) Filed: Aug. 16, 2016

(65) Prior Publication Data

US 2017/0052528 A1 Feb. 23, 2017

(30) Foreign Application Priority Data

Aug. 19, 2015 (JP) .................................. 2015-162323
Jul. 1, 2016 (JP) .................................. 2016-132089

(51) Int. Cl.
*E05B 15/00* (2006.01)
*G05B 19/406* (2006.01)
(Continued)

(52) U.S. Cl.
CPC ......... *G05B 19/406* (2013.01); *G05B 19/042* (2013.01); *G06Q 10/00* (2013.01); *H04B 7/18513* (2013.01); *E02B 1/00* (2013.01)

(58) Field of Classification Search
CPC ............ G05B 19/406; G05B 19/042; G05B 19/0428; H04B 7/18513; H04B 7/18515; H04B 7/18517
(Continued)

(56) References Cited

U.S. PATENT DOCUMENTS 4,630,395 A * 12/1986 Nasatka .................. E01F 13/08
49/13
5,466,088 A * 11/1995 Nasatka .................. E01F 13/08
404/6
(Continued)

FOREIGN PATENT DOCUMENTS

JP 2002-016606 A 1/2002
JP 2003-278122 A 10/2003
(Continued)

*Primary Examiner* — Chi Q Nguyen
(74) *Attorney, Agent, or Firm* — Baker Botts L.L.P.

(57) ABSTRACT

A control station, a slave station, a control method of the control station, and a control method of the slave station capable of securing an evacuation time and controlling a gate to be closed are provided. A control station of an embodiment is a control station in a gate control system for controlling operations of gates. The gate control system including the control station and slave stations. The control station including: an information acquisitor and a control information transmitter. The information acquisitor acquires emergency information via satellite communication. The control information transmitter simultaneously transmits gate control information for controlling the gates to the slave stations via the satellite communication on the basis of the emergency information.

15 Claims, 15 Drawing Sheets

(51) Int. Cl.
*H04B 7/185* (2006.01)
*G05B 19/042* (2006.01)
*G06Q 10/00* (2012.01)
*E02B 1/00* (2006.01)

(58) Field of Classification Search
USPC ..... 49/24, 31, 358, 506, 49, 13, 131, 25, 35
See application file for complete search history.

(56) References Cited

U.S. PATENT DOCUMENTS

| | | | | |
|---|---|---|---|---|
| 7,114,874 | B2* | 10/2006 | Burns | E01F 13/046 |
| | | | | 404/6 |
| 7,342,510 | B2* | 3/2008 | Pate | G09F 19/22 |
| | | | | 116/63 P |
| 8,099,902 | B2* | 1/2012 | Christensson | E05F 15/73 |
| | | | | 49/25 |
| 2010/0115093 | A1* | 5/2010 | Rice | H04W 4/70 |
| | | | | 709/224 |
| 2013/0186001 | A1* | 7/2013 | Cui | E06B 9/68 |
| | | | | 49/31 |
| 2014/0251478 | A1 | 9/2014 | Dolezilek et al. | |

FOREIGN PATENT DOCUMENTS

| | | |
|---|---|---|
| JP | 2007-110302 A | 4/2007 |
| JP | 2007-332534 A | 12/2007 |
| JP | 2012-070071 A | 4/2012 |

* cited by examiner

CONTROL STATION, SLAVE STATION, CONTROL METHOD OF CONTROL STATION, AND CONTROL METHOD OF SLAVE STATION

CROSS-REFERENCE TO RELATED APPLICATIONS

This application is based upon and claims the benefit of priority from Japanese Patent Application No. 2015-162323 filed on Aug. 19, 2015, and Japanese Patent Application No. 2016-132089 filed on Jul. 1, 2016; the entire contents of both of which are incorporated herein by reference.

BACKGROUND OF THE INVENTION

Field of the Invention

The present invention relates to a control station, a slave station, a control method of the control station, and a control method of the slave station.

Description of Related Art

When an earthquake or a tsunami occurs, emergency information (J-ALERT) is generated by a fire department via a communication satellite. When the J-ALERT is generated, a system notifies residents of information using a disaster prevention administrative radio system, a siren, or a cable broadcast. When information about the tsunami from the J-ALERT is received, an operator issues an instruction for closing a gate such as a sluice gate or a floodwall gate to prevent the land from being flooded. Automatically closing the gate is also being studied in consideration of the case in which it is difficult to secure an operator when a disaster occurs.

However, there is a problem in that it is difficult for people on the outside (the sea side) of a gate (a sluice gate or a floodwall gate) to evacuate to the inside (the land side) of the gate because a road or a waterway between the outside and the inside of the gate is blocked when the gate is automatically closed.

Japanese Unexamined Patent Application, First Publication No. 2003-278122 and Japanese Unexamined Patent Application, First Publication No. 2007-332534 are examples of the related art.

SUMMARY OF THE INVENTION

An object of the present invention is to provide a control station, a slave station, a control method of the control station, and a control method of the slave station capable of securing an evacuation time and controlling a gate to be closed.

A control station of an embodiment is a control station in a gate control system for controlling operations of gates, the gate control system including slave stations. The control station including an information acquisitor and a control information transmitter. The information acquisitor acquires emergency information via satellite communication. The control information transmitter simultaneously transmits gate control information for controlling the gates to the slave stations via the satellite communication on the basis of the emergency information.

DETAILED DESCRIPTION OF THE INVENTION

Hereinafter, a control station, a slave station, a control method of the control station, and a control method of the slave station according to embodiments will be described with reference to the drawings.

<First Embodiment>

First, the first embodiment will be described using FIG. 1.

Figure 1:
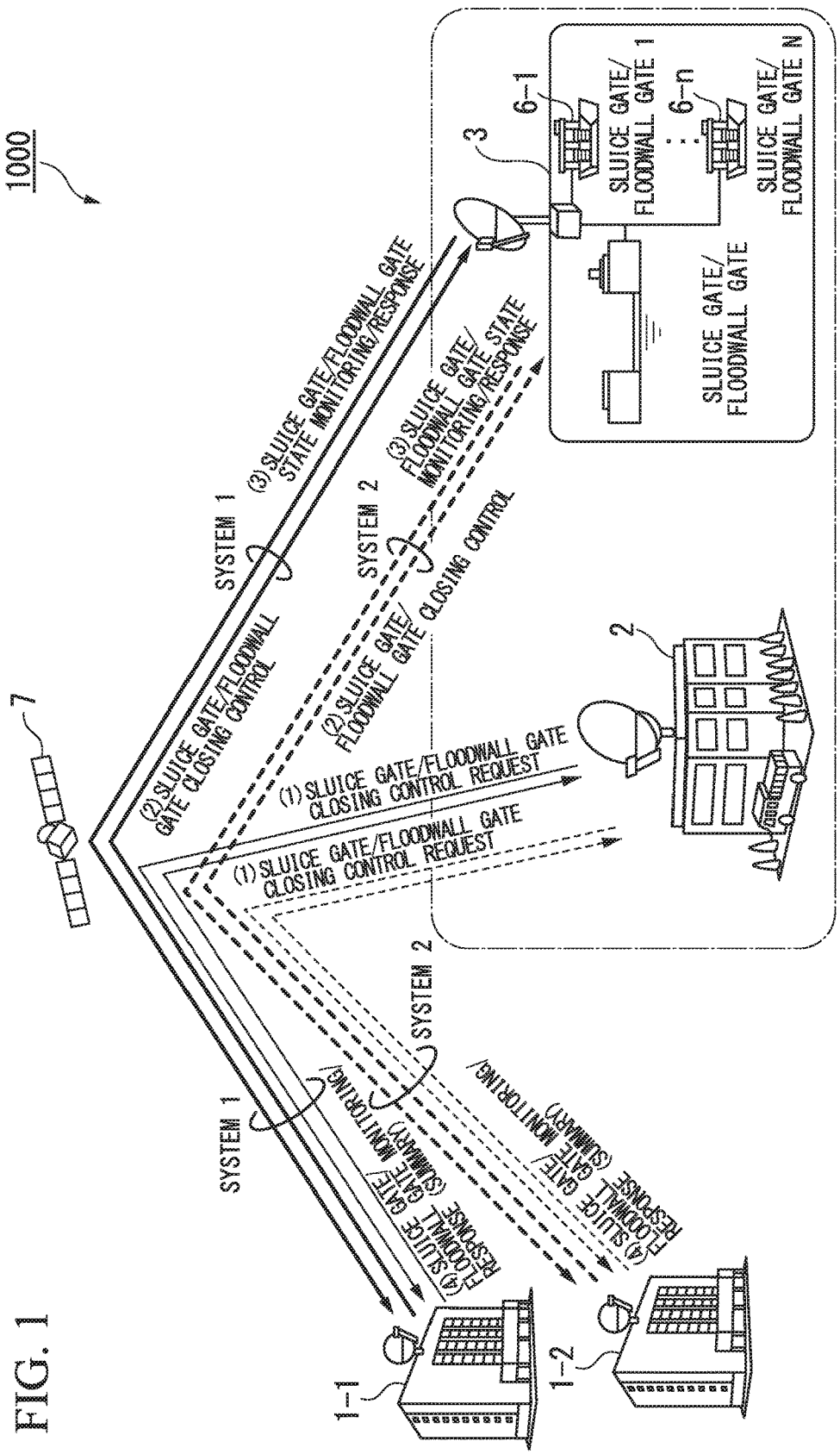
FIG. 1 is a diagram illustrating a system configuration of a gate control system of a first embodiment.

FIG. 1 is a diagram illustrating a system configuration of a gate control system 1000 using satellite communication of the first embodiment. In the following description, an example in which tsunami information for a notification of occurrence of a tsunami of a J-ALERT serves as emergency information will be described.

The gate control system 1000 includes a first control station 1-1, a second control station 1-2, a control center 2, and a slave station 3. The first control station 1-1, the second control station 1-2, and the control center 2 or the first control station 1-1, the second control station 1-2, and a plurality of slave stations 3 (only one station is representatively illustrated in FIG. 1) are provided and they are connected to be able to communicate with each other in satellite communication via a communication satellite 7. A plurality of gate control devices 6-1 to 6-*n* (n is an integer greater than or equal to 2) are connected to the slave station 3. Here, the gate is, for example, a sluice gate or a floodwall gate. Also, in the following description, the first control station 1-1 and the second control station 1-2 are referred to as a control station (also referred to as a "control station system") 1 when they are not particularly distinguished. Also, in the following description, gate control devices 6-1 to 6-n are referred to as a gate control device 6 when they are not particularly distinguished.

The first control station 1-1 is, for example, a facility provided in a public office which is the center of an administrative region (for example, a metropolitan office, a provincial office, and a prefectural office in the case of the prefectural unit system). The first control station 1-1 operates all sluice gates/floodwall gates managed by the control station (for example, within the corresponding prefecture in the case of the prefectural unit system). According to the reception of the J-ALERT or an instruction from the control center 2, the first control station 1-1 transmits control information for closing the sluice gate/floodwall gate to the slave station 3.

The second control station 1-2 is, for example, a facility provided in a common building for government offices geographically separated from the first control station. Similar to the first control station 1-1, the second control station 1-2 operates all sluice gates/floodwall gates managed by the control station. For example, according to the reception of the J-ALERT or an instruction from the control center 2, the second control station 1-2 transmits control information to the slave station 3. Here, a plurality of control stations are arranged and therefore it is possible to improve availability and reliability even when a malfunction occurs in the control station. Also, it is desirable that the installation position of the first control station 1-1 and the installation position of the second control station 1-2 be geographically separated in consideration of a risk that a satellite link may be down due to the influence at the time of occurrence of a disaster such as an earthquake or the influence of a guerrilla rainstorm or the like, but a distance of an installation position or an installation place is not limited.

The control center 2 is arranged in, for example, a government building of a local government of a city, a town, a village, etc., a local fire station, etc. The control center 2 manages a gate connected to the slave station 3 within its own jurisdiction. The control center 2 finds an opened/closed state of the gate connected to each slave station 3 and transmits control information to the first control station 1-1 or the second control station 1-2 in a control signal for closing or opening the gate according to an instruction of a staff member of the control center when it is determined that closing or opening is necessary.

The slave station 3 includes a gate control device 6. The slave station 3 transmits information for controlling the gate to be opened/closed to the gate control device 6 corresponding thereto in response to an instruction from the control station 1. For example, the slave station 3 controls the gate to be closed or opened for the gate control device 6 corresponding thereto according to the control information of the opening/closing.

Here, a gate to be controlled in the present embodiment is, for example, a sluice gate for closing a waterway of a river or a bay or a floodwall gate for closing a pathway. The gate such as the sluice gate or the floodwall gate is closed at the time of occurrence of a tsunami or the like to form a part of an embankment.

Figure 2:
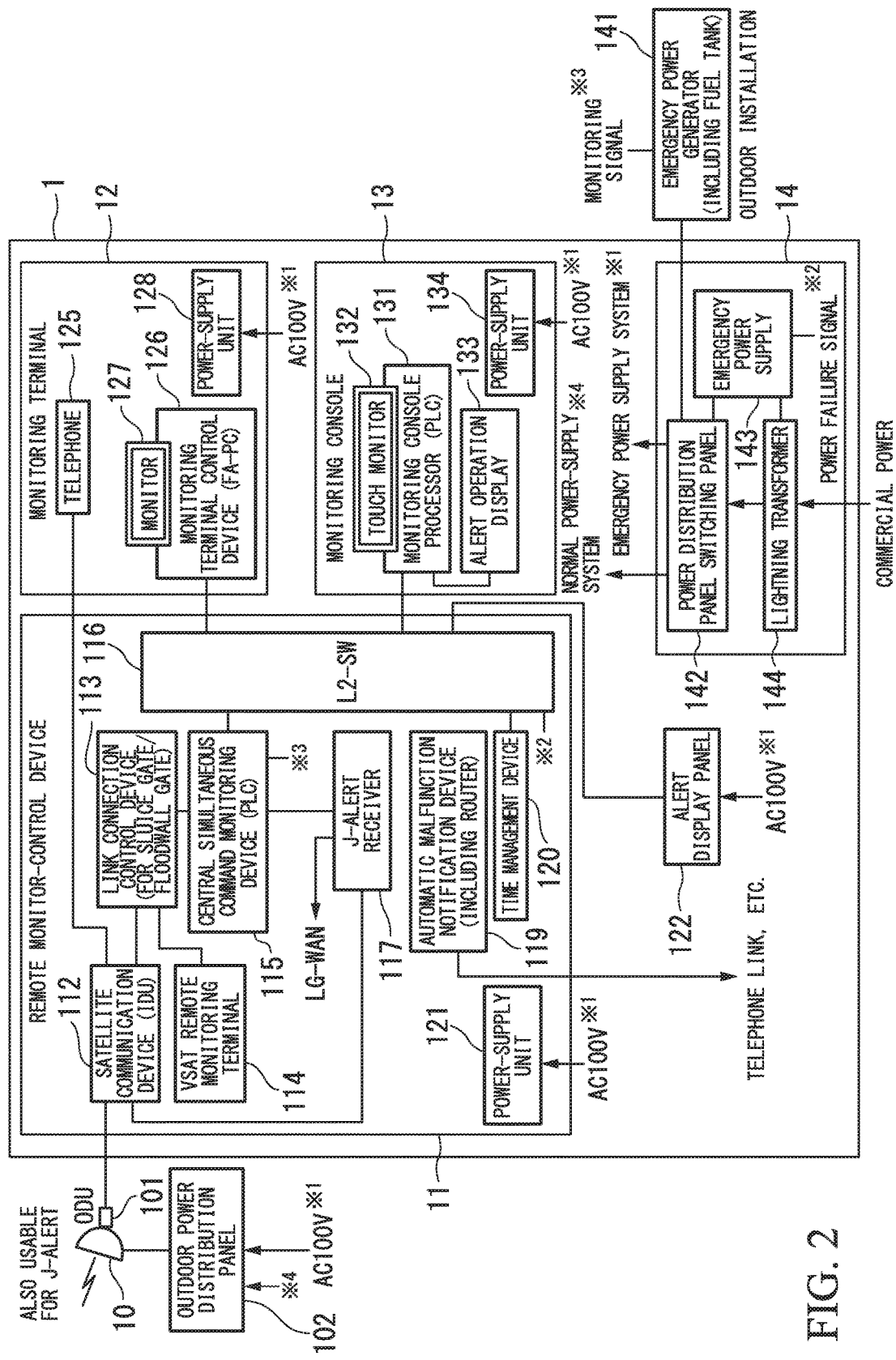
FIG. 2 is a block diagram illustrating an example of a functional configuration of a control station of the first embodiment.

Next, a functional configuration of the control station will be described using FIG. 2. FIG. 2 is a block diagram illustrating an example of a functional configuration of the control station of the first embodiment.

In FIG. 2, the control station includes a control station device 1 and an antenna device 10. The control station device 1 includes a remote monitoring control device 11, a monitoring terminal 12, a monitoring console 13, and a power-supply facility 14. Also, hereinafter, the control station device is simply referred to as a "control station."

The antenna device 10 performs the reception of a signal of the J-ALERT and the transmission/reception of a signal of the control center or the slave station. The antenna device 10 includes an outdoor unit (ODU) 101. The ODU 101 is attached to a front surface of the antenna and performs a transmission process and a reception process (a transmission/reception process) on a signal reflected by the antenna and transmitted/received to/from the communication satellite. The ODU 101 outputs the signal received from the communication satellite to the satellite communication device (IDU) (hereinafter simply referred to as a "satellite communication device") 112. Also, the ODU 101 outputs a signal received from the satellite communication device 112 to the communication satellite.

A power-supply voltage of AC 100 V serving as an emergency power supply system is supplied from the power-supply facility 14 to the antenna device 10 via the outdoor power distribution panel 102 (as illustrated by *1). Also, a power-supply voltage of AC 100 V used in a normal power-supply system is supplied from the power-supply facility 14 to the antenna device 10 via the outdoor power distribution panel 102 (as illustrated by *4). Even when a commercial power supply serving as a normal power supply is stopped, a power-supply voltage of an emergency power-supply system is supplied and therefore the antenna device 10 can continue the operation.

The remote monitoring control device 11 includes a satellite communication device 112, a link connection control device 113, a very small aperture terminal (VSAT) remote monitoring terminal 114, a central simultaneous command monitoring device 115, a layer-2 switch (L2-SW) 116, a J-ALERT receiver 117, an automatic malfunction notification device (including a router) 119, a time management device 120, a power-supply unit 121, and an alert display panel 122.

The satellite communication device 112 separates a signal of the J-ALERT received by the ODU 101 of the antenna device 10 and a signal from the control center or the slave station. The satellite communication device 112 outputs the separated signal of the J-ALERT to the J-ALERT receiver 117. Also, the satellite communication device 112 outputs the separated signal acquired from the control center 2 or the slave station 3 to the link connection control device 113. Also, the satellite communication device 112 outputs the signal acquired from the link connection control device 113 to the antenna device 10.

Also, the satellite communication device 112 functions as an indoor unit (IDU) which modulates and demodulates a transmission/reception signal to/from the communication satellite to be transmitted/received by the ODU 101. When the signal is a control signal transmitted from the control center 2 or the slave station 3, the satellite communication device 112 outputs the demodulated signal to the link connection control device 113. Also, when the received signal is a telephone-related signal, the satellite communication device 112 outputs the demodulated signal to a telephone 125. Likewise, the satellite communication device 112 demodulates a control signal acquired from the link connection control device 113 and a satellite phone-related signal acquired from the telephone 125 and outputs the demodulated signals to the ODU 101.

The link connection control device 113 controls a connection of a communication link with the control center 2 or the slave station 3. The link connection control device 113 establishes a communication link with the control center 2 or the slave station 3 transmitting the signal on the basis of the control signal transmitted from the control center 2 or the slave station 3. Also, when the control signal is transmitted from the central simultaneous command monitoring device 115 to the control center 2 or the slave station 3, the link connection control device 113 establishes the communication link with the control center 2 or the slave station 3 of the transmission destination on the basis of the control signal acquired from the central simultaneous command monitoring device 115.

The VSAT remote monitoring terminal 114 monitors, for example, communication states of the control center 2 and the slave station 3 and displays whether the communication state is abnormal. In a method of determining whether the communication state is abnormal, for example, it is possible to transmit a predetermined command to the control center and the slave station and make the determination according to the presence/absence of a response to the transmitted command. Whether the communication state is abnormal may be periodically determined at a predetermined time interval.

The J-ALERT receiver 117 acquires a signal of the J-ALERT separated and output by the satellite communication device 112. The J-ALERT receiver 117 may acquire the signal of the J-ALERT from the communication satellite and acquire the signal of the J-ALERT via a local government wide area network (LGWAN) (not illustrated) or the Internet (not illustrated) to reliably perform the reception of the J-ALERT.

The J-ALERT receiver 117 outputs alert information based on the acquired signal of the J-ALERT to the central simultaneous command monitoring device 115. For example, when information of the J-ALERT is a tsunami alert (a giant tsunami), information about a range of the tsunami alert, a height of the tsunami at each place, an arrival time of the tsunami at each place, etc. may be included.

The central simultaneous command monitoring device 115 outputs a simultaneous closing instruction to the slave station to be monitored.

Also, the central simultaneous command monitoring device 115 may output a simultaneous closing instruction on the basis of an instruction from the monitoring console 13 of the control station 1. Further, the central simultaneous command monitoring device 115 may output a simultaneous notification instruction on the basis of an instruction from the control center.

Also, the central simultaneous command monitoring device 115 may select a gate to be closed (a slave station to which activation information to be described below is transmitted) on the basis of information of the J-ALERT (for example, the occurrence of the tsunami and a region in which the tsunami occurs) when the information of the J-ALERT is included. Further, the information may be transmitted to the control center 2, the slave station 3, and a facility of a cable broadcast, a disaster prevention broadcast, or the like.

Also, the central simultaneous command monitoring device 115 is implemented (configured) using a programmable logic controller (PLC). That is, the central simultaneous command monitoring device 115 is described as a functional block having the above-mentioned function and the functional block can be implemented by, for example, a function of software or hardware. In the present embodiment, the function of the central simultaneous command monitoring device 115 can be implemented by a program executed by the PLC. An example in which a PLC or a factory automation (FA)-PC is used as a method of implementing a function illustrated in a functional block is also shown in the following description.

Also, the central simultaneous command monitoring device 115 receives a monitoring signal (illustrated by *3) from an emergency power generator 141 to be described below. The monitoring signal is a signal for monitoring the emergency power generator 141 and is used to monitor, for example, an operation state of the emergency power generator 141.

The L2-SW 116 is a network switch for connecting devices in layer 2 (a data link layer). The L2-SW 116 connects the central simultaneous command monitoring device 115, the time management device 120, and the alert display panel 122 in the remote monitoring control device 11. Also, the L2-SW 116 communicably connects the monitoring terminal control device 126 of the monitoring terminal 12 and the monitoring console processor 131 of the monitoring console 13.

The L2-SW 116 receives a power failure signal from a normal power-supply (UPS) 143 (as illustrated by *2). The power failure signal is output from the UPS 143 to provide a notification of the commercial power failure. When the power failure signal is input, the L2-SW 116 outputs, for example, a signal for executing a shutdown process to the monitoring terminal control device 126 or the like. The monitoring terminal control device 126 or the like receiving the signal can prevent a malfunction due to the power failure by executing the shutdown process before the power failure.

The automatic malfunction notification device 119 detects a malfunction inside the remote monitoring control device 11 and externally outputs information about the detected malfunction through a telephone link or the like.

The time management device 120 manages time. The time management device 120 may be configured to correct time information used in the remote monitoring control device 11 on the basis of, for example, information acquired from a server on the network.

The power-supply unit 121 receives a power-supply voltage of AC 100 V supplied from the power-supply facility 14 (as illustrated by *1). That is, permanent power is supplied by the power-supply facility 14 and therefore the remote monitoring control device 11 can continue an operation even when the commercial power supply is stopped.

The alert display panel 122 displays alert information based on information of the J-ALERT. The alert display panel 122 may display, for example, tsunami information, earthquake information, weather information, etc.

The monitoring terminal 12 includes a telephone 125, a monitoring terminal control device 126, a monitor 127, and a power-supply unit 128.

The telephone 125 receives an incoming call of a satellite phone signal using the VSAT system via the satellite communication device 112 and also sends an outgoing call. Also, the telephone using the VSAT system is assumed to be arranged in the control center and the slave station to be described below, and the control station, the control center and the slave station are assumed to be able to perform communication using the VSAT system.

The monitoring terminal control device 126 includes the monitor 127 and the monitoring terminal control device 126 graphically displays, for example, device information acquired from the remote monitoring control device 11 or information acquired via a network (not illustrated) on the monitor 127. Also, a video of a television camera acquired from the slave station may be configured to be displayed on the monitor. The FA-PC is assumed to be used in the monitoring terminal control device 126. Because the FA-PC is characterized in that a communication function or an image processing function is excellent, the monitoring terminal control device 126 can be used for the purpose of utilizing the characteristic of the FA-PC. For example, the monitoring terminal control device 126 may be configured to communicate with the FA-PC arranged in a control center system to be described below and perform data communication capable of being executed between PCs such as sharing of device information.

The power-supply unit 128 receives a power-supply voltage of AC 100 V supplied from the power-supply facility 14 (as illustrated by *1). That is, permanent power is supplied by the power-supply facility 14 and therefore the monitoring terminal 12 can continue an operation even when the commercial power supply is stopped.

The monitoring console 13 includes a monitoring console processor 131, a touch monitor 132, an alert operation display 133, and a power-supply unit 134.

The monitoring console processor 131 includes a touch monitor 132. The monitoring console processor 131 displays a monitoring result or device information acquired from the remote monitoring control device 11 on the touch monitor 132. The touch monitor 132 displays, for example, an opened/closed state of a gate managed by the control station 1, an output state of a simultaneous notification instruction output to the slave station by the remote monitoring control device 11, an output state of a simultaneous closing instruction, etc. For example, when a gate to be closed according to the simultaneous closing instruction is not closed, the monitoring console processor 131 notifies an operator of an error by displaying a gate which is not closed. The operator may perform an operation of the monitoring console processor 131 on the basis of information about the gate displayed on the touch monitor 132.

A screen for manually opening/closing an individual gate may be displayed on the touch monitor 132. Also, a screen for selecting a slave station serving as a target of a simultaneous notification instruction or a simultaneous closing instruction or a screen for selecting a gate serving as a target of a simultaneous closing instruction in each slave station may be displayed on the touch monitor. Also, a screen for controlling a device other than the gate may be displayed on the touch monitor. Also, a screen indicating an opened/closed state of the gate which cannot be controlled from the control station may be displayed on the touch monitor.

Also, the monitoring console processor 131 may include an operation panel constituted of a switch, a lamp, etc. For example, a switch for performing a gate opening/closing operation or a lamp for indicating an operation state of the gate may be arranged in the operation panel. The PLC is used in the monitoring console processor 131.

The alert operation display 133 may be configured to be able to manually transmit a simultaneous notification instruction or a simultaneous closing instruction. Also, the alert operation display 133 may be configured to instruct an individual slave station to activate an information facility. For example, an operation of instructing the selected slave station to output a siren sound from the speaker can be performed.

The power-supply unit 134 receives a power-supply voltage of AC 100 V supplied from the power-supply facility 14 (as illustrated by *1). That is, permanent power is supplied by the power-supply facility 14 and therefore the monitoring console 13 can continue an operation even when the commercial power supply is stopped.

The power-supply facility 14 includes an emergency power generator 141, a power distribution panel 142, a UPS 143, and a lightning transformer 144.

The power-supply facility 14 supplies a power-supply voltage of AC 100 V of an emergency power supply system illustrated by *1 to load facilities (the antenna device 10, the remote monitoring control device 11, the monitoring terminal 12, and the monitoring console 13). Also, a power-supply voltage of AC 100 V of an normal power-supply system illustrated by *4 is supplied to the antenna device 10. Also, a power failure signal illustrated by *2 is output to the L2-SW 116.

Because the power-supply facility 14 can supply permanent power by the UPS 143, each load facility can continue the operation even when the commercial power supply is stopped. Several seconds are required to activate the emergency power generator 141, but the UPS 143 can supply power within several ms and therefore the rapid supply of power is possible. On the other hand, because the emergency power generator 141 can supply power for a longer time than in the UPS 143, the power can be supplied for a long time. In the present embodiment, the power-supply facility 14 includes the emergency power generator 141 and the UPS 143, and thereby can stably supply power for a short time and a long time.

The emergency power generator 141 outputs a monitoring signal (illustrated by *3) to the central simultaneous command monitoring device 115. Also, the UPS 143 outputs the power failure signal (illustrated by *2) to the L2-SW 116.

The power distribution panel 142 has a function of a switching panel which performs switching between power from the commercial power supply and power from the UPS 143. That is, the power distribution panel 142 can perform switching between power of an normal power-supply system (illustrated by *4) and power of an emergency power supply system (illustrated by *1) to output the power.

The lightning transformer 144 is a transformer highly resistant to lightning and reduces a surge voltage due to lightning.

The power-supply facility 14 in the present embodiment supplies commercial power to a load as it is when the commercial power supply is normal. On the other hand, when the commercial power supply is stopped, the commercial power supply is disconnected and power is supplied from an inverter of the UPS 143.

In the present embodiment, the central simultaneous command monitoring device 115 has an alert information acquisition function of acquiring alert information based on emergency information delivered via a communication satellite when the remote monitoring control device 11 controls the gate. Also, the central simultaneous command monitoring device 115 has an activation information transmission function of transmitting activation information for activating a notification facility on the basis of the alert information. Also, the simultaneous command monitoring device 115 has a determination function of determining whether a predetermined condition is satisfied after the activation information is transmitted. Also, the simultaneous command monitoring device 115 has a control information transmission function of transmitting control information for controlling the gate when the predetermined condition is satisfied.

Figure 3:
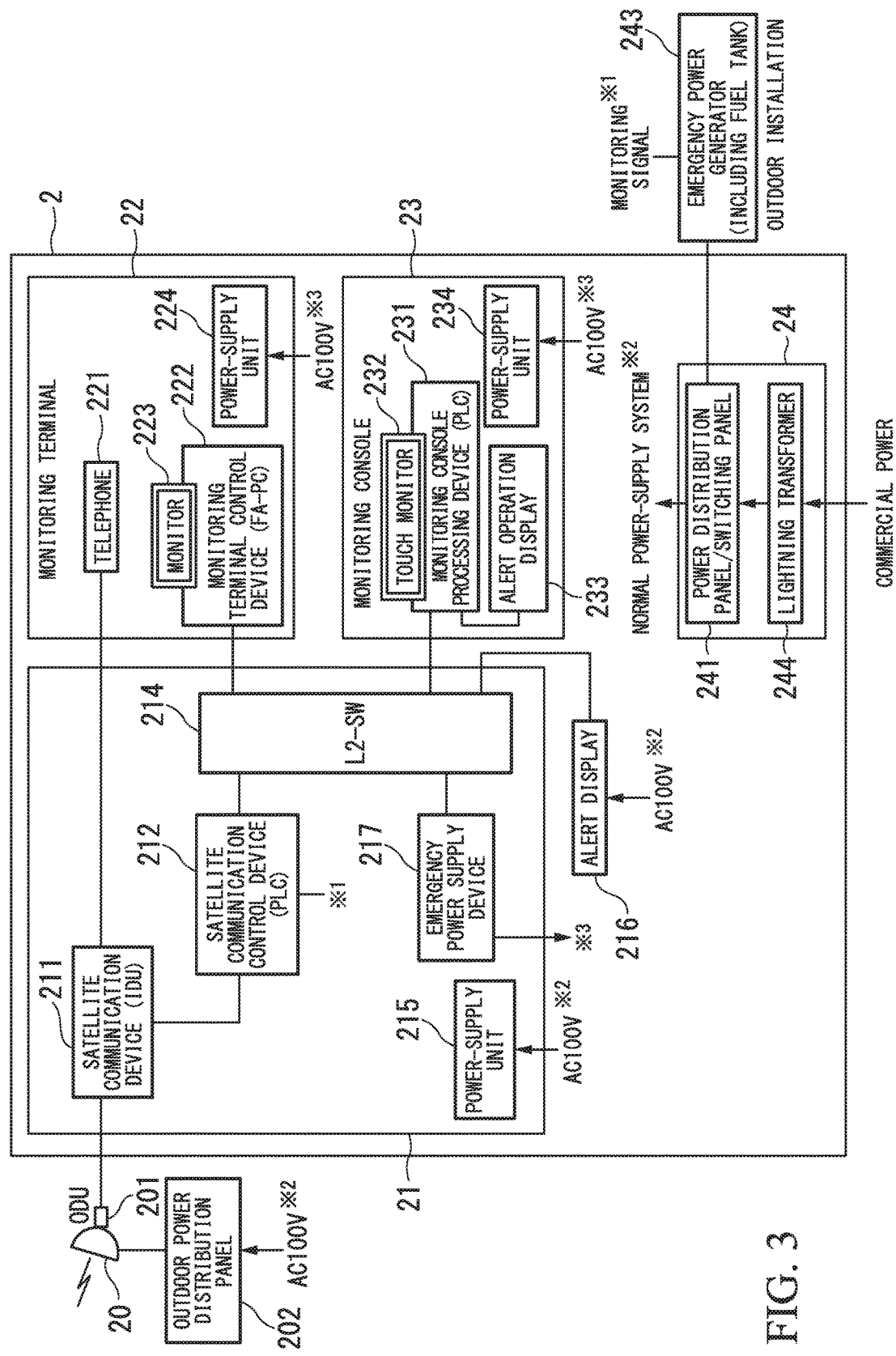
FIG. 3 is a block diagram illustrating an example of a functional configuration of a control center of the first embodiment.

Next, a functional configuration of the control center 2 will be described using FIG. 3. FIG. 3 is a block diagram illustrating an example of the functional configuration of the control center 2 of the first embodiment. In the present embodiment, everything illustrated in FIG. 3 will be described as a control center system.

In FIG. 3, the control center 2 includes a remote monitoring control device 21, a monitoring terminal 22, a monitoring console 23, and a power-supply facility 24. Also, the description of a function similar to the function described with reference to FIG. 2 will be omitted.

The remote monitoring control device 21 includes a satellite communication device 211, a satellite communication control device 212, an L2-SW 214, a power-supply unit 215, and a UPS 217.

The satellite communication device 211 is connected to the antenna device 20. The satellite communication device 211 has a function of the IDU and modulates and demodulates a transmission/reception signal to/from the communication satellite to be transmitted/received by the ODU 201 of the antenna device 20.

When information of a simultaneous notification instruction transmitted to the slave station by the remote monitoring control device 11 is acquired, the satellite communication control device 212 outputs the information to the monitoring terminal 22.

When device information transmitted by the remote monitoring control device 11 is acquired, the satellite communication control device 212 outputs the information to the monitoring terminal 22.

When information of a simultaneous notification instruction transmitted to the slave station by the remote monitoring control device 11 is acquired, the satellite communication control device 212 outputs the information to the monitoring console 23.

Also, when a control instruction for opening/closing of the gate or the like to be controlled by the slave station is acquired from the monitoring console 23, the satellite communication control device 212 outputs a gate control instruction to the remote monitoring control device 11 via the satellite communication device 211. Also, the satellite communication control device 212 is implemented using the PLC.

Also, a monitoring signal (illustrated by *1) is input from the emergency power generator 243 to the satellite communication control device 212.

The UPS 217 supplies power of an emergency power supply system to the L2-SW 214 and supplies power of the emergency power supply system illustrated by *3 to the monitoring terminal 22 and the monitoring console 23.

Because the power-supply unit 215, the alert display panel 216, and the UPS 217 have configurations similar to those of the power-supply unit 121, the alert display panel 122, and the UPS 217 in the remote monitoring control device 11 described with reference to FIG. 2, description thereof will be omitted.

The monitoring terminal 22 includes a telephone 221, a monitoring terminal control device (FA-PC) 222, a monitor 223, and a power-supply unit 224.

The telephone 221 is connected to the telephone 125 of the monitoring terminal 12 described with reference to FIG. 2 and therefore communication can be performed via the communication satellite even at the time of a disaster.

The monitoring terminal control device 222 displays, for example, device information acquired from the remote monitoring control device 21 or information acquired via a network (not illustrated) on the monitor 223. Also, a video of a television camera of the slave station acquired from the control station 1 may be configured to be displayed on the monitor. The FA-PC is assumed to be used in the monitoring terminal control device 222 similar to the monitoring terminal control device 126 described with reference to FIG. 2. The monitoring terminal control device 222 may be configured to communicate with the monitoring terminal control device 126 of the control station and share information with the monitoring terminal control device 126.

Because the power-supply unit 224 has a configuration similar to that of power-supply unit 128 described with reference to FIG. 2, description thereof will be omitted.

The monitoring console 23 includes a monitoring console processing device 231, a touch monitor 232, an alert operation display 233, and a power-supply unit 234.

Similar to the monitoring console processor 131 described with reference to FIG. 2, the monitoring console processing device 231 includes a touch monitor 232. For example, information about a gate of a slave station monitored in its control center is displayed on the touch monitor 232. The monitoring console processing device 231 may be configured to individually control the gate displayed on the touch monitor 232. For example, a gate which is closed according to a simultaneous closing instruction from the control station 1 and a gate which is not closed according to the simultaneous closing instruction may be displayed to be identifiable. Also, device information transmitted from the control station 1 may be displayed on the touch monitor 232.

Also, the monitoring console processing device 231 may be configured to be able to individually control a gate which is not closed according to the simultaneous closing instruction from the control station due to any cause.

Also, the monitoring console processing device 231 may include an operation panel constituted of a switch, a lamp, etc. A switch for performing a gate opening/closing operation or a lamp for indicating an operation state of the gate may be arranged in the operation panel.

The monitoring console processing device 231 transmits an instruction for controlling the gate to the remote monitoring control device 11 of the control station via the satellite communication control device 212. That is, even when the control center individually controls the gate, the instruction for controlling the gate is transmitted from the control station to the gate. Also, the monitoring console processing device 231 is implemented using the PLC.

Because the alert operation display 233 and the power-supply unit 234 have configurations similar to those of the alert operation display 133 and the power-supply unit 134 described with reference to FIG. 2, description thereof will be omitted.

The power-supply facility 24 includes a power distribution panel 241 and a lightning transformer 244. Also, the power distribution panel 241 receives the supply of power from the commercial power supply via the lightning transformer 244 and receives the supply of power from the emergency power generator 243 including a fuel tank. The power distribution panel 241 supplies the load facility with AC 100 V of the normal power-supply system (as illustrated by "*2").

For the power-supply facility 24, the emergency power generator 243 is installed outdoors. An installation space is less limited when the emergency power generator 243 is installed outdoors than when the emergency power generator 243 is installed indoors. Also, because the power supplied from the power distribution panel 241 is also received from the emergency power generator 243, the emergency power generator 243 can supply power in place of the commercial power supply even in the normal power-supply system.

Figure 4:
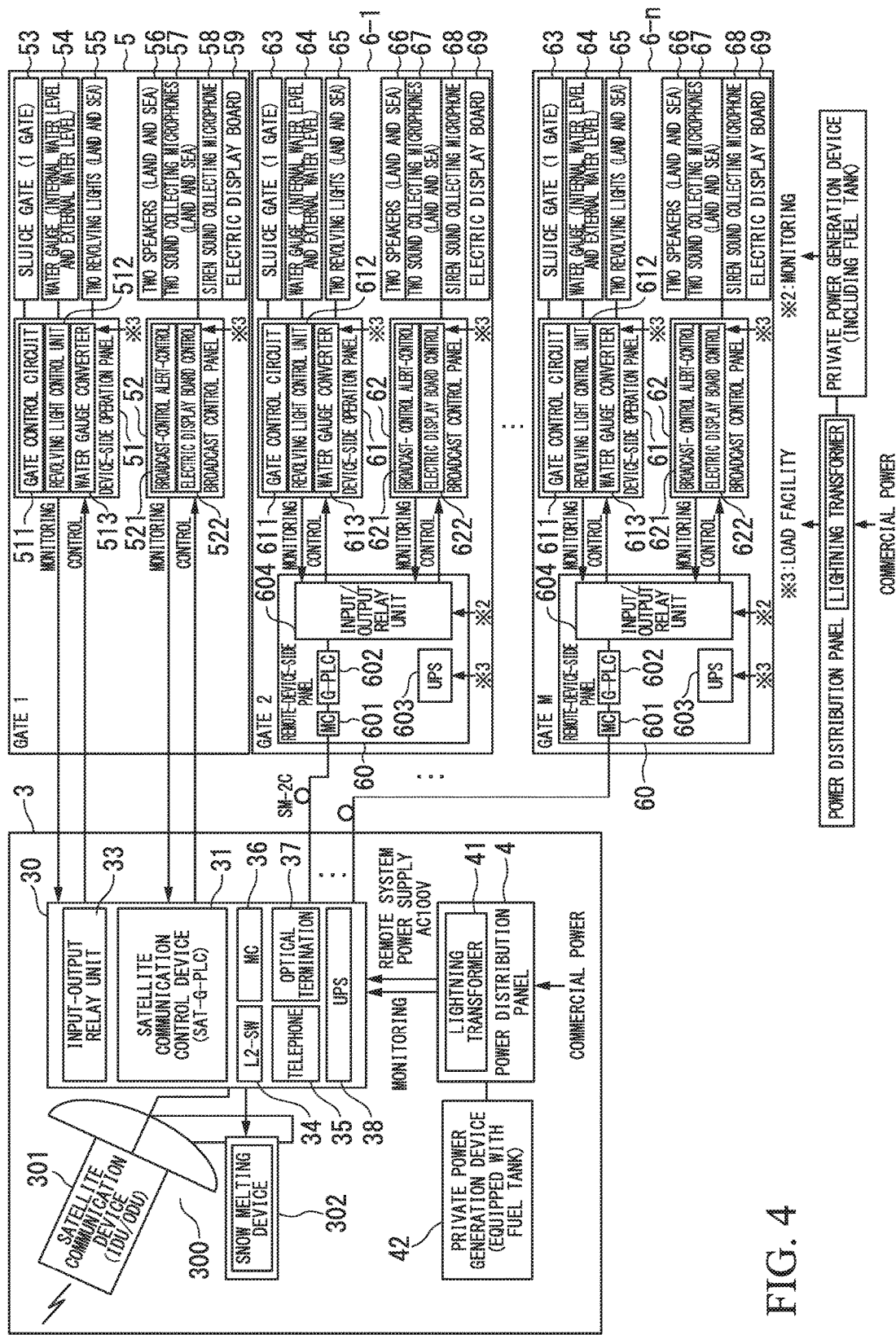
FIG. 4 is a block diagram illustrating an example of a functional configuration of a slave station of the first embodiment.

Next, a functional configuration of the slave station 3 will be described using FIG. 4. FIG. 4 is a block diagram illustrating an example of the functional configuration of the slave station 3 of the first embodiment.

The slave station 3 in the present embodiment activates a notification facility for notifying that gates are closed in the vicinity of the gates without immediately closing the gates when information based on emergency information received by the control station is acquired.

Here, information for activating the notification facility received from the control station is also referred to as activation information. Also, the slave station 3 opens or closes (opens/closes) the gate on the basis of the acquired information. Information for opening/closing the gate received from the control station is also referred to as control information. Also, the case in which the slave station 3 closes the gate according to the control information will be described in the present embodiment.

In FIG. 4, the slave station 3 is communicably connected to the gate control system 5 and the gate control devices 6-1 to 6-n. Among the gate control devices 6-1 to 6-n, the gate control device 6-n will be described.

A slave station device (simply referred to as a "slave station") 3 includes a remote monitoring control device 30, a power-supply facility 4, and an antenna device 300. The remote monitoring control device 30 includes a satellite communication control device (SAT-G-PLC) 31, an input-output relay unit 33, an L2-SW 34, a telephone 35, a media converter (MC) 36, an optical termination 37, and a UPS 38.

The antenna device 300 includes a satellite communication device 301 and a snow melting device 302. The satellite communication device 301 has the function of the ODU and the function of the IDU described with reference to FIG. 2. The snow melting device 302 melts the snow attached to the antenna. The antenna device 300 is assumed to receive the supply of power from the remote monitoring control device 30.

The satellite communication control device 31 includes an SAT-PLC function and a G-PLC function. The SAT-PLC function is a function of outputting information for the gate control system 5 or the like on the basis of information acquired in the satellite communication and transmitting information to the control station 1 in the satellite communication on the basis of the information acquired from the gate control system 5 or the like. Also, the G-PLC function is a function of outputting the control instruction from the satellite communication control device 31 to the gate control system 5 or the like and collecting device information from the gate control system 5 or the like. In the present embodiment, the satellite communication control device 31 is assumed to have an SAT-G-PLC function including both the SAT-PLC function and the G-PLC function. However, the SAT-PLC function and the G-PLC function may be configured to be implemented by separate devices.

The input-output relay unit 33 performs a relay operation between the remote monitoring control device 30 and the gate control system 5 or the like in a predetermined communication scheme.

The MC 36 converts a signal of an optical fiber cable and a signal of an electric cable. The optical termination 37 is an end (a connection part) of an optical fiber. "SM-2C" connected between the remote monitoring control device 30 and the gate control system 5 or the like indicates a two-core optical fiber cable. However, the optical fiber cable connected between the remote monitoring control device 30 and the gate control system 5 or the like is not limited thereto. In the slave station system, communication resistant to noise is enabled in a broad band by connecting the optical fiber cable connected between the remote monitoring control device 30 and the gate control system 5 or the like arranged in a predetermined region (for example, a harbor, a village, or the like) to perform control.

Also, description of the L2-SW 34, the telephone 35, and the UPS 38 will be omitted.

The power-supply facility 4 includes a lightning transformer 41. The power-supply facility 4 receives power from the commercial power supply and the private power generation device 42 equipped with the fuel tank. The power-supply facility 4 supplies a power-supply voltage (a remote system power-supply voltage) of AC 100 V to the remote monitoring control device 30 and monitors a power-supply state of the remote monitoring control device 30.

The gate control system 5 includes a device-side operation panel 51, a broadcast control panel 52, a sluice gate 53, a water gauge 54, revolving lights 55, speakers 56, sound collecting microphones 57, a siren sound collecting microphone 58, and an electric display board 59. The device-side operation panel 51 includes a gate control circuit 511, a revolving light control unit 512, and a water gauge converter 513. The broadcast control panel 52 has broadcast-control alert-control 521 and electric display board control 522.

The device-side operation panel 51 is controlled by the G-PLC function of the satellite communication control device 31 of the remote monitoring control device 30 and outputs device information for monitoring to the satellite communication control device 31. The broadcast control panel 52 is controlled by the G-PLC function of the satellite communication control device 31 and outputs device information for monitoring to the satellite communication control device 31.

The gate control circuit 511 is a control circuit which controls the sluice gate (gate) 53 to be opened/closed. Also, the gate control circuit 511 acquires information indicating a state of the gate from the sluice gate 53. The state of the gate is, for example, a state in which the gate is in an opening operation, a state in which the gate is in a closing operation, a state in which the gate is open, a state in which the gate is closed, a state in which a malfunction occurs in the gate, or the like. In the present embodiment, the gate control circuit 511 is assumed to able to transmit a closing signal to the sluice gate 53 and further acquire information indicating that the gate is in the closing operation (in the closing operation). It is possible to detect the fact that the gate is in the closing operation by, for example, a sensor or the like which detects a position of the gate. The gate control circuit 511 transmits information indicating that the gate is in the closing operation to the remote monitoring control device 30 after transmitting a closing signal to the sluice gate 53. The remote monitoring control device 30 may be configured to transmit the state of the gate to the control station 1 via the antenna device 300.

A plurality of means for opening/closing the gate are, for example, gate motor drive, pneumatic drive, drive using gravity, etc. In the motor drive, for example, the gate is opened/closed, for example, by driving wheels, etc. which move the gate in a motor. In the pneumatic drive, the gate may be opened/closed (closed) by applying air pressure to a cylinder which moves the gate. Also, in the drive using the gravity, the gate may be closed by removing a stopper which supports a weight or the like of the gate to be vertically opened/closed by a solenoid valve or the like.

The revolving light control unit 512 controls the operation of the revolving light 55 to be turned on/off. The water gauge converter 513 converts a water level of the water gauge 54 into an electric signal. The water gauge 54 can measure a water level inside the gate and a water level outside the gate. In the broadcast-control alert-control 521, the speakers 56, the sound collecting microphones 57, and the siren sound collecting microphone 58 illustrated as a safety information dissemination facility are controlled. The speakers 56 provide sound information in the vicinity of the gate by outputting a siren sound or a sound for providing an alert notification. The sound collecting microphones 57 provide the control station 1 with sound information by collecting the sound information for finding a state of the gate by sound. The siren sound collecting microphone 58 can be used to monitor that siren sounds are correctly output by collecting the siren sounds output from the speakers 56. In the electric display board control 522, display information is provided by controlling the electric display board 59 to perform a predetermined display operation.

The gate control devices 6-1 to 6-n are other gate control devices. All the gate control devices 6-1 to 6-n have the same configuration.

The gate control devices 6-1 to 6-n basically have the same configuration as the gate control system 5, except that the gate control devices 6-1 to 6-n have remote-device-side panels 60. Each of the remote-device-side panels 60 includes an MC 601, a G-PLC unit 602, a UPS 603, and an input/output relay unit 604. The MC 601, the G-PLC unit 602, the UPS 603, and the input/output relay unit 604 have the same configurations as the MC 36, a G-PLC unit (not illustrated), the UPS 38, and the input-output relay unit 33 in the remote monitoring control device 30. That is, because the gate control system 5 is installed near the remote monitoring control device 30, the functions of the MC, the G-PLC unit, the UPS, and the input/output relay unit are accommodated in the remote monitoring control device 30. On the other hand, because the gate control device 6-n performs communication based on an optical fiber cable installed at a position separated from the remote monitoring control device 30, the gate control device 6-n has the functions of the MC, the G-PLC unit, the UPS, and the input/output relay unit. Also, when a plurality of gate control devices are installed near the remote monitoring control device 30, it is possible to reduce the cost by configuring the gate control system 5.

Also, the gate control system 5 and the gate control device 6-n include the same device as the power-supply facility 4 (including the private power generation device 42) and power is supplied to components illustrated by *2 and *3. Also, the power-supply facility 4 may be provided in each of the gate control system 5 and the gate control device 6-n and the power-supply facility 4 may be shared by the gate control system 5 and the gate control device 6-n.

<Flow of Signal of Entire System>

Figure 5:
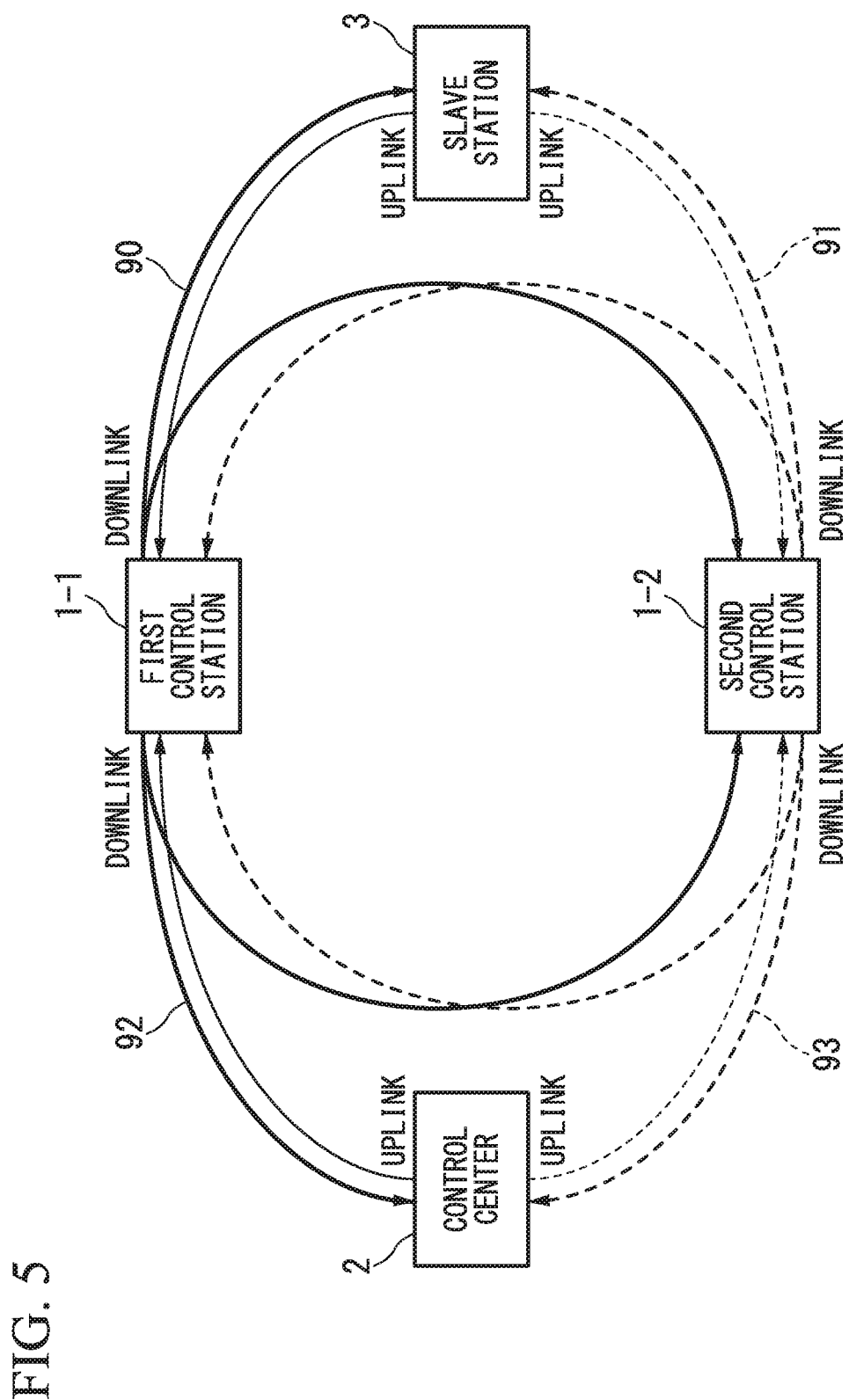
FIG. 5 is a diagram illustrating communication of a gate control system in the first embodiment.

Next, the flow of the signal of a gate control system 1000 will be described using FIG. 5. FIG. 5 is a diagram illustrating communication of the gate control system 1000 in the first embodiment. As illustrated in FIG. 5, links from the control station 1 to the control center 2 and the slave station 3 will be described as downlinks and links from the control center 2 and the slave station 3 to the control station 1 will be described as uplinks. Also, a band used by the first control station will be described as system 1 and a band used by the second control station will be described as system 2.

In the gate control system 1000 in the present embodiment, each of the first control station 1-1 and the second control station 1-2 receives a J-ALERT (for example, a notification of occurrence of a tsunami).

When the J-ALERT (for example, the notification of the occurrence of the tsunami) is received, the first control station 1-1 transmits a closing instruction to the slave station 3 using a simultaneous command link 90 using a downlink band of system 1. At this time, the second control station 1-2 monitors the simultaneous command link 90 of the downlink band of system 1. As a result, the second control station 1-2 can find the operation state of the first control station 1-1.

Also, when the J-ALERT (for example, the notification of the occurrence of the tsunami) is received, the second control station 1-2 independent of the first control station 1-1 transmits a closing instruction to the slave station 3 using a simultaneous command link 91 using a downlink band of system 2. At this time, the first control station 1-1 monitors the simultaneous command link 91 of the downlink band of system 2. As a result, the first control station 1-1 can find the operation state of the second control station 1-2.

The slave station 3 controls the gate to be opened/closed by instructing the gate control device 6 to open/close the gate according to control information transmitted from the first control station 1-1 and the second control station 1-2. The slave station 3 receiving the control information for closing the gate transmits a response indicating the state of the gate (for example, an opened/closed state) to the first control station 1-1 and the second control station 1-2 via the communication satellite. For example, the slave station 3 transmits the response to the first control station 1-1 using an uplink band of system 1. Also, for example, the slave station 3 transmits the response to the second control station 1-2 using an uplink band of system 2. The first control station 1-1 and the second control station 1-2 receive the response transmitted from the slave station 3 and transmit the received response to the control center 2.

For example, the first control station 1-1 transmits the response to the control center 2 using a simultaneous command link 92 using a downlink band of system 1.

The second control station 1-2 monitors the simultaneous command link 92 of the downlink band of system 1.

Also, for example, the second control station 1-2 transmits the response to the control center 2 using a simultaneous command link 93 using a downlink band of system 2. The first control station 1-1 monitors the simultaneous command link 93 of the downlink band of system 2.

<First Automatic Gate Operation Process>

Figure 6:
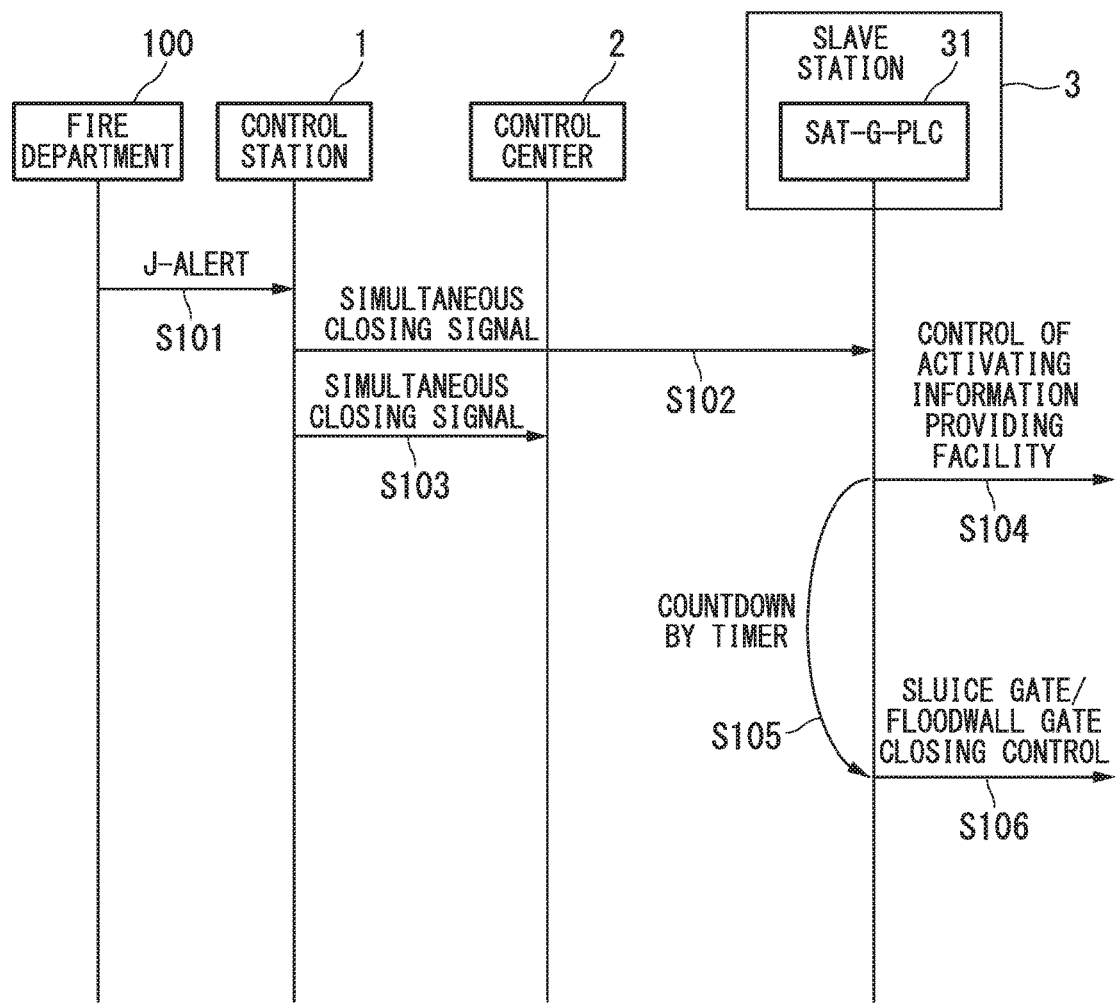
FIG. 6 is a sequence diagram illustrating an example of a first automatic gate operation process of the first embodiment.

Next, the first automatic gate operation process will be described using FIG. 6. FIG. 6 is a sequence diagram illustrating an example of the first automatic gate operation process of the first embodiment.

An example of the first automatic gate operation process in which the control station 1 receiving the J-ALERT automatically transmits a simultaneous closing instruction to the SAT-G-PLC unit 31 of the slave station 3 (illustrated as "SAT-G-PLC"; the same is true for FIGS. 7 to 11) and a closing instruction is transmitted from the slave station 3 to the sluice gate/floodwall gate is shown. The simultaneous closing instruction is a control instruction for closing the gate to be simultaneously transmitted. In the present embodiment, a signal of the simultaneous closing instruction is transmitted using simultaneous transmission of satellite communication.

Also, because the SAT-G-PLC unit 31 described with reference to FIG. 6 is implemented by the SAT-G-PLC function of the satellite communication control device 31 described with reference to FIG. 4, description thereof will be given using the same reference sign. Also, although one slave station 3 is illustrated in FIG. 6, a plurality of slave stations 3 are arranged and the illustration of the other slave stations 3 is omitted. A similar process is assumed to be performed in each of the slave stations 3.

In FIG. 6, the control station 1 first acquires the J-ALERT transmitted from a fire department 100 illustrated as a predetermined government office via a communication satellite (step S101).

The control station 1 receiving the J-ALERT transmits a simultaneous closing signal (a simultaneous closing instruction) to the SAT-G-PLC units 31 of all the slave stations 3 (step S102) and transmits the simultaneous closing signal (the simultaneous closing instruction) to the control center 2 (illustrated as a "control center"; the same is true for FIGS. 7 to 11) (step S103). The transmission of the simultaneous closing signal is performed by the central simultaneous command monitoring device 115 of the control station 1 described with reference to FIG. 2.

The control center 2 acquiring the simultaneous closing signal may display information about a slave station 3 to which the simultaneous closing signal is transmitted and a gate (a sluice gate/floodwall gate) to be closed according to the simultaneous closing signal on the touch monitor 232 or the like as described with reference to FIG. 4.

Also, the SAT-G-PLC unit 31 of the slave station 3 acquiring the simultaneous closing signal transmits activation information for controlling a safety information dissemination facility to be activated (step S104). The safety information dissemination facility is activated and therefore a notification indicating that the gate is closed is provided in the vicinity of the gate through a siren, an announcement, or the like. It is possible to encourage people in the vicinity of the gate to evacuate to the inside of the gate by notifying them that the gate is being closed.

The SAT-G-PLC unit 31 of the slave station 3 acquiring the simultaneous closing signal starts a timer when a control signal is transmitted and determines whether a predetermined time has elapsed from the transmission of the control signal according to a countdown operation by the timer (step S105). It is determined whether the predetermined time has elapsed from the transmission of the control signal to secure an evacuation time for the closing of the gate (a predetermined condition for closing the gate).

Also, the predetermined time to be counted down may be a preset fixed time (for example, five minutes or the like). Also, a tsunami arrival time or the like may be set on the basis of information of the J-ALERT. Also, a value differing according to the gate may be set as a time set by the timer.

Although the case in which the passage of a predetermined time from the transmission of the activation information for controlling the safety information dissemination facility to be activated is confirmed as the predetermined condition for securing the evacuation time for closing the gate is shown in the present embodiment, the predetermined condition for securing the evacuation time is not limited thereto. The predetermined condition may include, for example, the condition that no human or vehicle impeding the closing of the gate is detected by a television camera, a sensor, or the like.

When the predetermined time has elapsed, the SAT-G-PLC unit 31 transmits control information for controlling the gate (the sluice gate or the floodwall) to be closed to the device-side operation panel 51 or 61 which is a device to operate the gate (step S106).

<Second Automatic Gate Operation Process>

Figure 7:
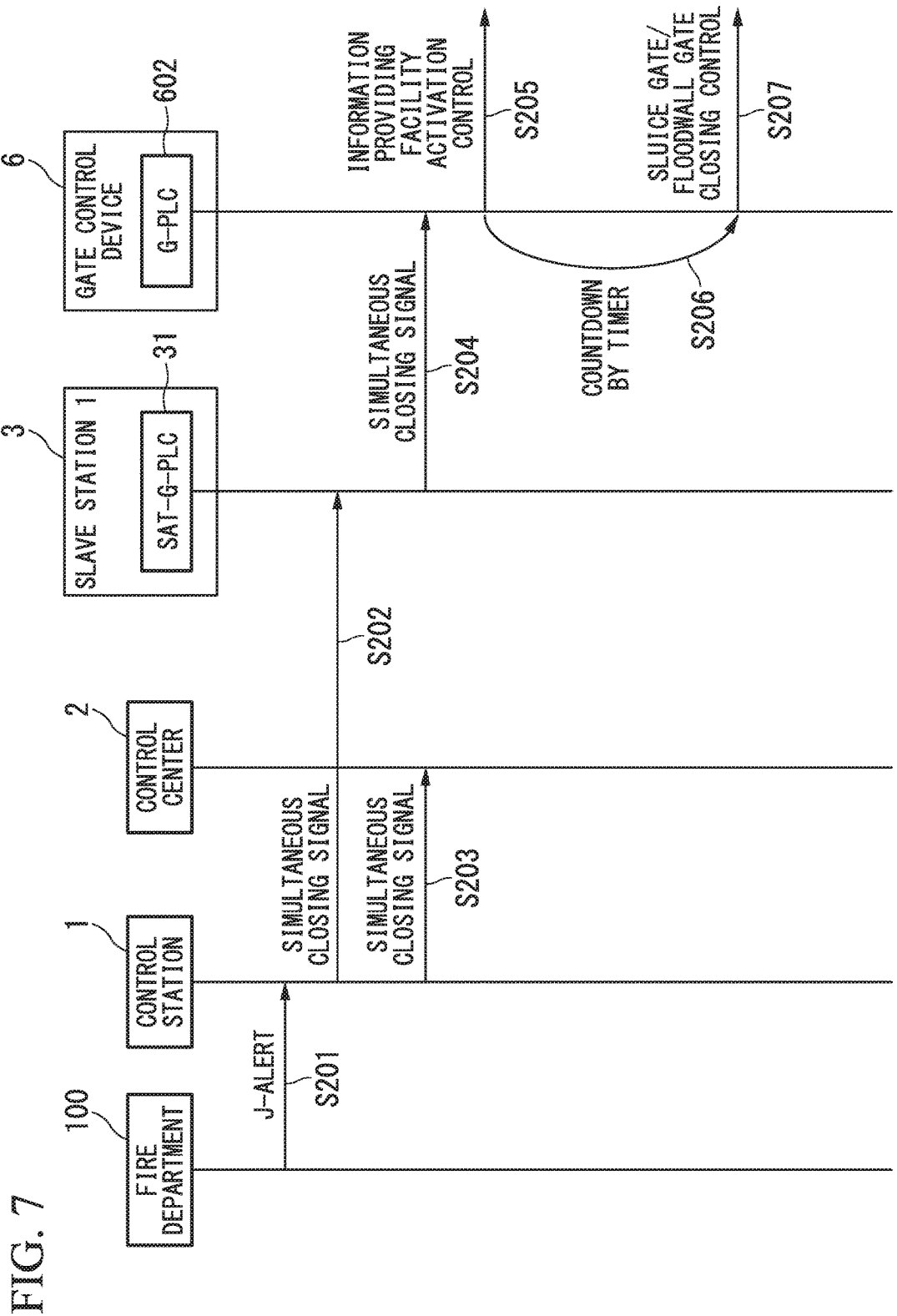
FIG. 7 is a sequence diagram illustrating an example of a second automatic gate operation process of the first embodiment.

Next, the second automatic gate operation process will be described using FIG. 7. FIG. 7 is a sequence diagram illustrating an example of the second automatic gate operation process of the first embodiment.

In FIG. 7, the second automatic gate operation process is a method of transmitting a simultaneous closing control signal from the slave station to the gate control device without dividing a notification signal and a closing signal when the slave station and the gate control device are installed separately. Also, because the method is executed by the gate control device 6 in the present embodiment, the same reference signs are assumed to be used.

The SAT-G-PLC unit 31 described with reference to FIG. 7 is implemented by the SAT-PLC function of the satellite communication control device 31 described with reference to FIG. 4. Also, the G-PLC unit 602 described with reference to FIG. 7 is implemented by the G-PLC function of the satellite communication control a remote-device-side panel control device (not illustrated) and the G-PLC unit 602 of the gate control device 6-n described with reference to FIG. 4.

Also, although one gate control device 6 is illustrated in FIG. 7, a plurality of gate control devices 6 are arranged and the illustration of the other gate control devices 6 is omitted. A similar process is assumed to be performed in each of the gate control devices 6.

In FIG. 7, the control station 1 first acquires the J-ALERT transmitted from the fire department 100 illustrated as a predetermined government office via a communication satellite (step S201).

The control station 1 receiving the J-ALERT transmits a simultaneous closing signal to the SAT-G-PLC units 31 of the slave stations 3 (step S202). Further, the simultaneous closing signal is transmitted to the control center 2 which manages the slave stations 3 to which the simultaneous closing signal is transmitted (step S203). The control center 2 acquiring the simultaneous closing signal may display information about a slave station 3 to which the simultaneous closing signal is transmitted and a gate (a sluice gate/floodwall gate) to be closed according to the simultaneous closing signal on the touch monitor 232 or the like.

The SAT-G-PLC unit 31 of the slave station 3 (the slave station 1) acquiring the simultaneous notification instruction transmits a simultaneous closing instruction based on the simultaneous notification instruction to the G-PLC unit 602 of the gate control device 6 (step S204).

The G-PLC unit 602 starts a timer for determining whether a predetermined time has elapsed and determines whether the predetermined time has elapsed after a control signal for activating the safety information dissemination facility managed by the gate control device 6 is transmitted (step S206).

The G-PLC unit 602 of the gate control device 6 transmits a control instruction for closing a gate (a sluice gate/floodwall gate) to be closed to each gate when the predetermined time has elapsed (step S207).

The slave station 3 in which the SAT-G-PLC unit 31 of FIG. 7 is arranged is connected to the gate control device 6 in which the G-PLC unit 602 is arranged through an optical cable or the like arranged in a separate place as described above.

Accordingly, communication of the SAT-G-PLC unit 31 and the G-PLC unit 602 is likely to be disabled due to damage or the like of the optical cable in the event of a disaster or the like. In FIG. 7, the G-PLC unit 602 which is a gate operating device acquires a simultaneous notification instruction serving as alert information based on emergency information delivered via the communication satellite from the SAT-G-PLC unit 31, transmits a control signal for activating a safety information dissemination facility on the basis of the simultaneous notification instruction, determines whether a predetermined condition of a predetermined time having elapsed from the transmission of the control signal for activating the safety information dissemination facility is satisfied, and transmits a control instruction for closing the gate to each gate when the predetermined time has elapsed. Accordingly, for example, even when trouble such as a communication failure in satellite communication between the control station 1 and the slave station 3 or optical communication between the slave station 3 and the gate control device 6 occurs, the gate control device 6 can secure an evacuation time to control the gate.

Figure 8:
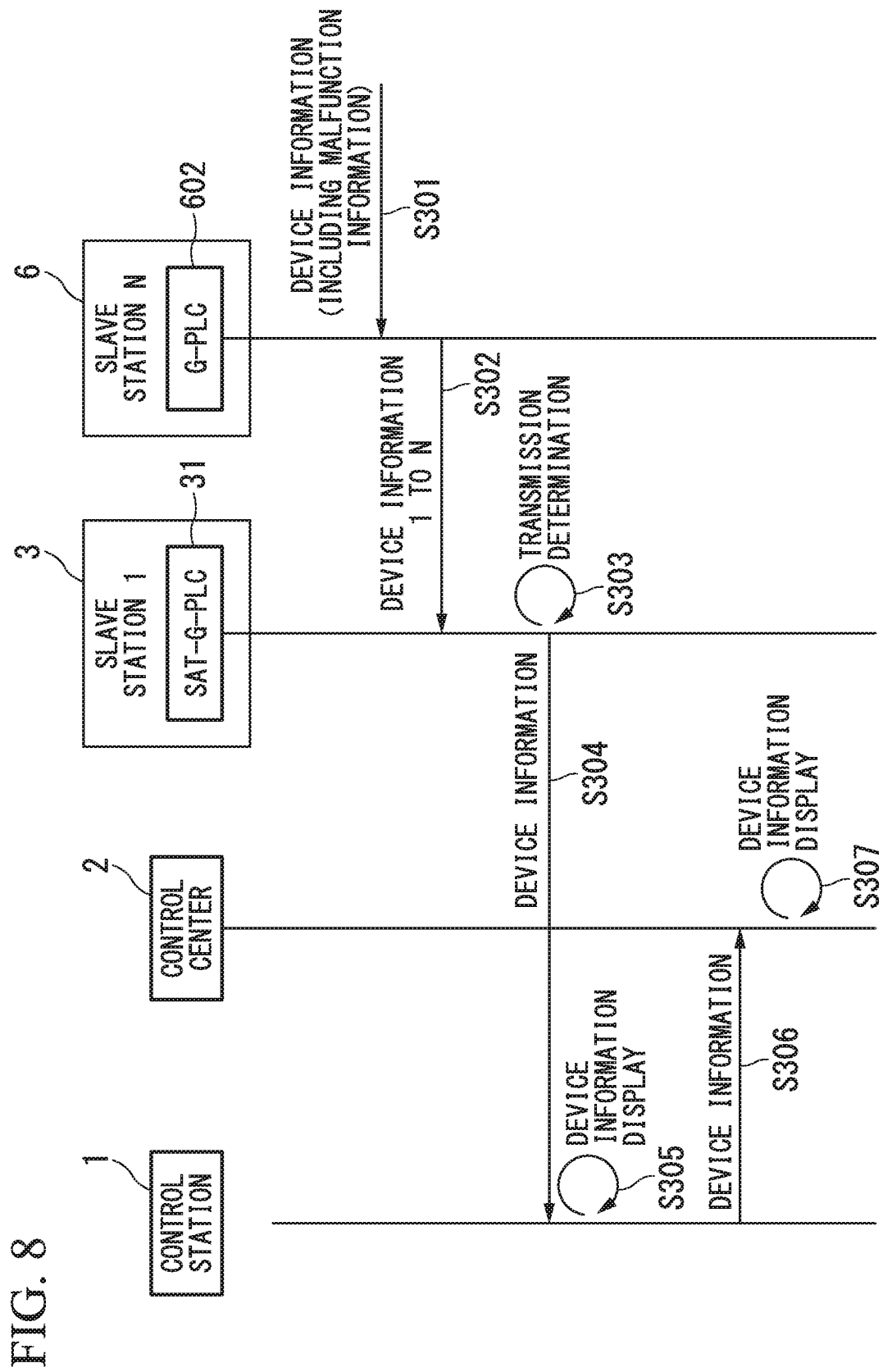
FIG. 8 is a sequence diagram illustrating an example of a device information collecting process of the first embodiment.

Next, a process of collecting device information will be described using FIG. 8. FIG. 8 is a sequence diagram illustrating an example of the process of collecting the device information of the first embodiment.

In FIG. 8, the G-PLC unit 602 of the gate control device 6 collects information about a water level measured by a water gauge, sound information collected by the sound collecting microphone, information about a video captured by a television camera, and device information such as information about a sensor for detecting an opened/closed state or an obstacle of opening/closing (step S301). The device information may include information about a malfunction of a device such as a gate. The G-PLC unit 602 transmits the collected device information to the SAT-G-PLC unit 31 of the slave station 3 (step S302).

The SAT-G-PLC unit 31 acquiring the device information makes a transmission determination of whether the collected device information should be transmitted to the control station 1 (step S303) and transmits the collected device information to the control station 1 when it is determined that the collected device information should be transmitted (step S304). The SAT-G-PLC unit 31 determines, for example, whether there is information which applies to a predetermined transmission condition among the collected device information as the transmission determination. The transmission condition is, for example, whether the time of collecting the device information is in a predetermined time zone, whether a transmission timing at which the device information is transmitted is a predetermined timing, whether the collected device information is of a predetermined type, or the like. Whether the transmission timing is the predetermined timing is, for example, whether a predetermined time is reached when the collected device information is transmitted at the predetermined time by batch processing. Also, whether the device information is of the predetermined type is, for example, whether the device information is information related to a malfunction of a device.

The control station 1 acquiring the device information from the SAT-G-PLC unit 31 performs a display process of displaying the acquired device information (step S305).

The device information can be displayed on, for example, the monitor 127 of the monitoring terminal control device 126 described with reference to FIG. 2. The control station 1 transmits the acquired device information to the control center 2 (step S306).

The control center 2 acquiring the device information from the control station 1 performs a display process of displaying the acquired device information (step S307). It is possible to display the device information on, for example, the monitor 223 of the monitoring terminal control device 222 described with reference to FIG. 3.

Because the control station 1, the control center 2, and the slave station 3 can collect the device information such as a malfunction of a device and a state of a gate in the present embodiment, it is possible to safely and reliably control the gate from a remote place. For example, when an instruction for automatically closing the gate is transmitted in the automatic gate operation process described with reference to FIGS. 6 and 7, the control station 1 or the control center 2 can confirm a gate which is not automatically closed and monitor the state of the gate, the state of the water level, etc. Also, the control station 1 performs a setting operation of removing a predetermined gate from targets to be simultaneously closed according to the state of the gate (for example, a state such as that a device which opens or closes the gate is malfunctioning).

Also, the control station 1 or the control center 2 may execute a process of manually operating the gate on the basis of the collected device information.

<First Manual Gate Operation Process>

Figure 9:
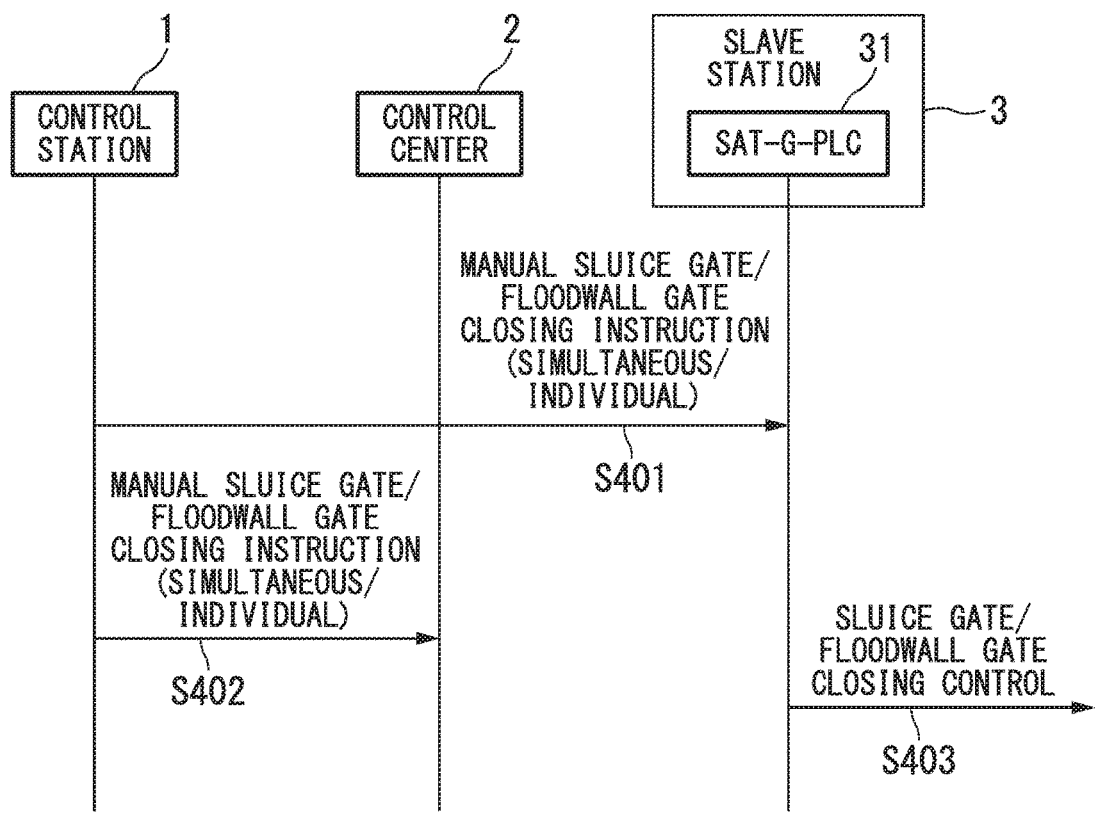
FIG. 9 is a sequence diagram illustrating an example of a first manual gate operation process of the first embodiment.

Next, the first manual gate operating process will be described using FIG. 9. FIG. 9 is a sequence diagram illustrating an example of the first manual gate operation process of the first embodiment.

The first manual gate operation process is a process of individually setting a gate to be closed in the control station 1 and transmitting an instruction for controlling simultaneous closing or the like to the gate set from the control station 1.

In FIG. 9, the control station 1 simultaneously transmits a closing instruction for closing the gate to be closed to the SAT-G-PLC units 31 of the slave stations 3 (step S401). The closing instruction transmitted to the slave stations 3 by the control station 1 is, for example, transmitted by an operator operating the monitoring console 13 described with reference to FIG. 2. It is possible to simultaneously transmit the closing instruction to manually designated slave stations 1 using the simultaneous transmission of the control station 1.

The control station 1 transmits information about the transmitted closing instruction to the control center 2 (step S402). The control center 2 acquiring the information about the closing instruction from the control station 1 may be configured to display information about a gate to be closed. The SAT-G-PLC unit 31 acquiring the closing instruction from the control station 1 outputs a control instruction for closing each gate (step S403).

Because the gate can be automatically closed on the basis of the J-ALERT and the gate can be manually operated from the control station 1 in the present embodiment, the gate can be manually operated, for example, when the gate is individually closed, when simultaneously closed gates are individually opened, or when the gates are simultaneously opened due to the cancellation of a tsunami alert. Also, the gate may be manually operated on the basis of device information as described with reference to FIG. 8.

<Second Manual Gate Operation Process>

Figure 10:
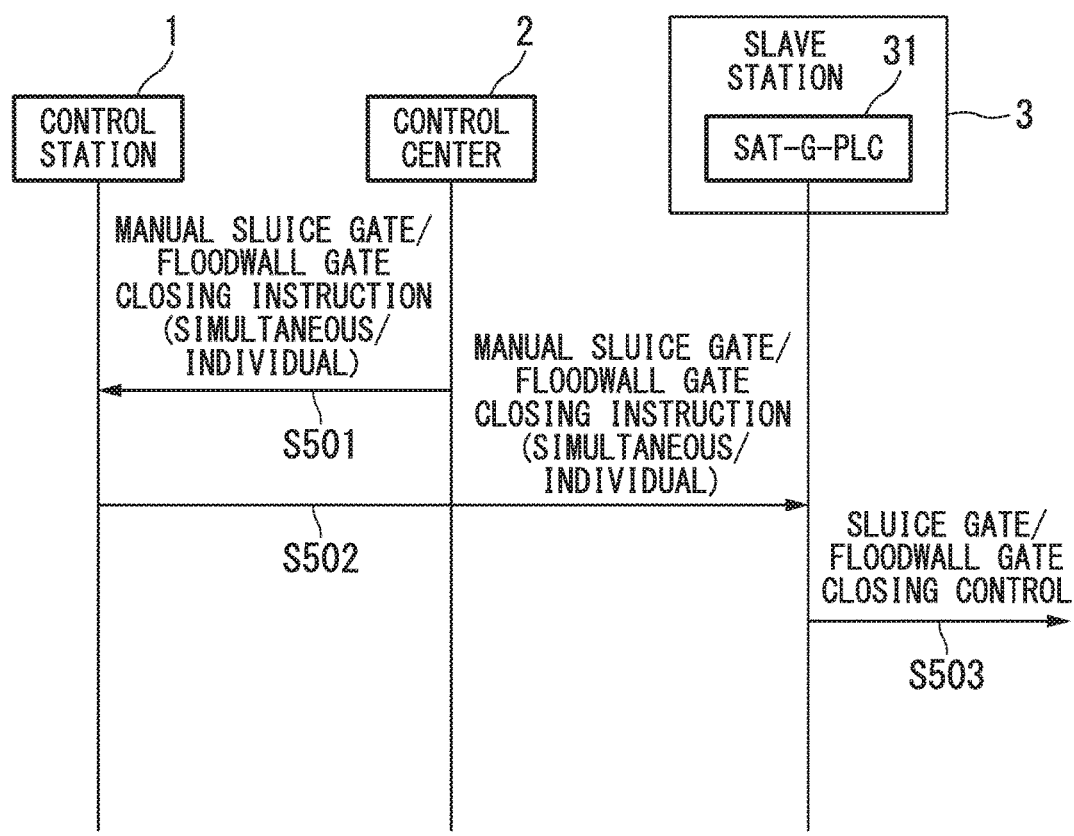
FIG. 10 is a sequence diagram illustrating an example of a second manual gate operation process of the first embodiment.

Next, the second manual gate operating process will be described using FIG. 10. FIG. 10 is a sequence diagram illustrating an example of the second manual gate operation process of the first embodiment.

The second manual gate operation process is a process of individually setting gates to be closed in the control center 2 and simultaneously transmitting an instruction of an operation of closing or the like to the gates set from the control center 2.

In FIG. 10, the control center 2 transmits a closing instruction for closing the gate to be closed to the control station 1 (step S5501). The closing instruction is transmitted by, for example, the operator operating the monitoring console 23 of FIG. 3.

The control station 1 simultaneously transmits the closing instruction to the SAT-G-PLC units 31 of the slave stations 3 which manage gates to be closed on the basis of the closing instruction acquired from the control center 2 (step S502). It is possible to manage the states of the gates in the control station 1 in a concentrated manner by transmitting the closing instruction transmitted from the control center 2 to the slave station 3 via the control station 1. Also, it is possible to reduce the load of the control center 2 because it is unnecessary to manage the control of individual gates in the control center 2.

The SAT-G-PLC unit 31 acquiring the closing instruction from the control station 1 outputs a control instruction for closing each gate.

The control center 2 may be configured to display information about gates to be closed on the monitor 127, etc.

In the present embodiment, it is possible to automatically close the gates on the basis of the J-ALERT, and for example, it is also possible to individually open/close the gates closed once because a manual operation is also possible. Also, when the gate is opened due to the cancellation of a tsunami alert, the manual operation is enabled from the control station. Also, the gates may be configured to be manually operated on the basis of device information as described with reference to FIG. 8.

A region managed by the control center 2 with respect to the control station 1 is limited and the control center 2 may normally be at a short distance from the slave station 3. Accordingly, it is easy for a manager who manages the control center 2 to individually handle, for example, a slave station 3 in which a problem occurs, as compared with a manager who manages the control station 1. It is possible to manually operate the gate from the control center 2 and facilitate the management of the gate for each region.

<Second Embodiment>

Next, the second embodiment will be described using FIG. 11.

In the above-mentioned first embodiment, a simultaneous closing instruction from the control station 1 to the slave stations 3 is transmitted when a J-ALERT is received and the slave station 3 controls the gate to be closed after an alert or the like is issued by activating the safety information dissemination facility. On the other hand, in the second embodiment, the instructions are divided into the simultaneous notification instruction and the closing instruction and the instructions are transmitted from the control station 1. FIG. 8 is a sequence diagram illustrating an example of an automatic gate operation process of the second embodiment.

Also, the function of the control station 1 described with reference to FIG. 11 can be implemented by the central simultaneous command monitoring device 115 described with reference to FIG. 2. Also, although one control station 1 is illustrated in FIG. 11, a plurality of control stations 1 may be arranged. When the plurality of control stations 1 are arranged, it is possible to improve availability in the entire system of the control station 1, the control center 2, and the slave station 3 because two communication paths are possible in the reception of the J-ALERT and the transmission/reception to/from the slave station 3 and the control center 2.

Figure 11:
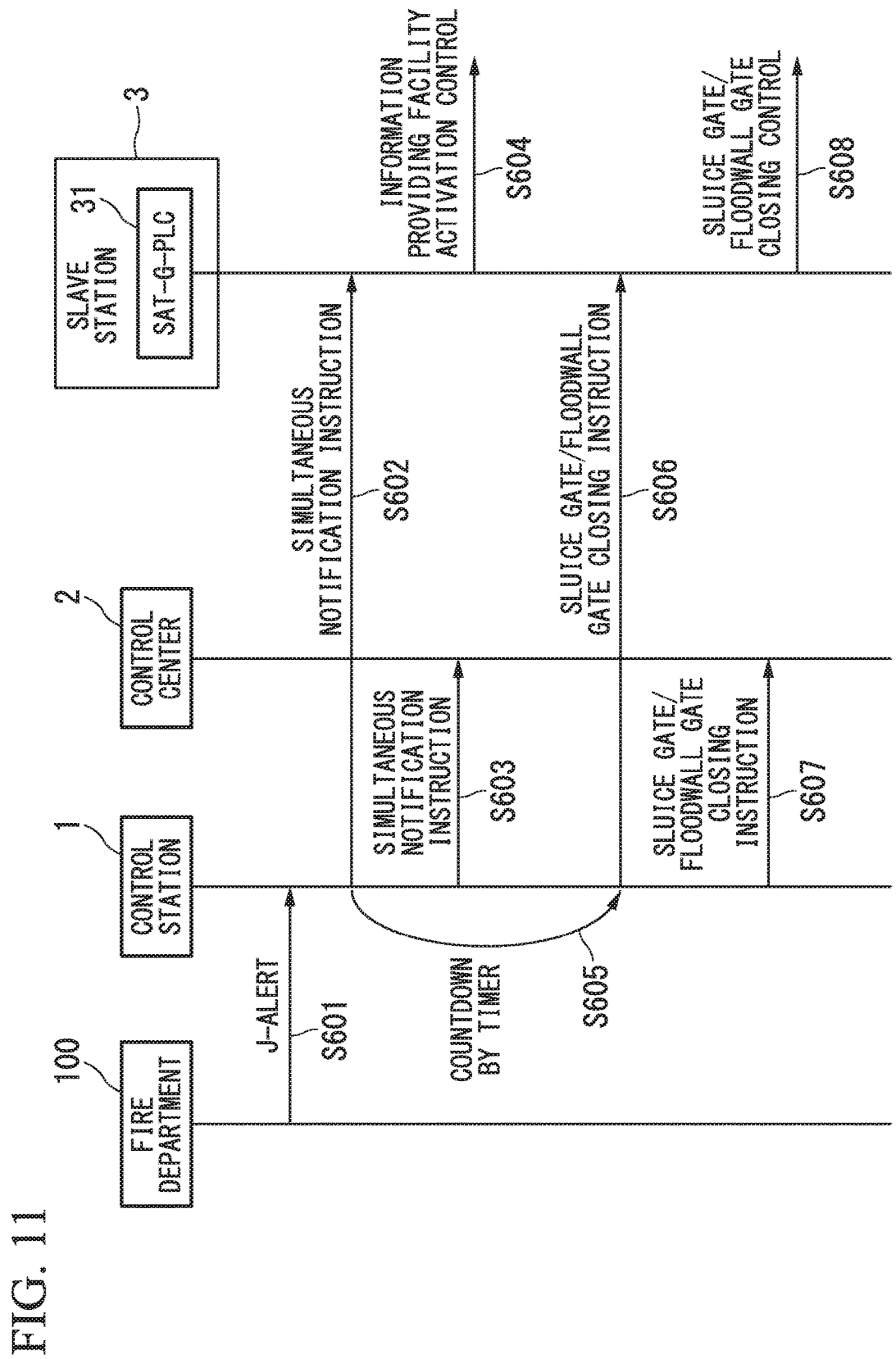
FIG. 11 is a sequence diagram illustrating an example of an automatic gate operation process of a second embodiment.

In FIG. 11, the control station 1 first acquires the J-ALERT transmitted from a fire department 100 illustrated as a predetermined government office via a communication satellite (step S601). The control station 1 acquiring the J-ALERT transmits the simultaneous notification instruction to the SAT-G-PLC units 31 of the slave stations 3 (step S602), and transmits the simultaneous notification instruction to the control center 2 which manages the slave station 3 to which the simultaneous notification instruction is transmitted (step S603). Also, a process of transmitting the simultaneous notification instruction is similar to the process described with reference to FIG. 6.

The process is similar to that of FIG. 6 in that the control center 2 acquiring the simultaneous notification instruction may display information about a slave station 3 to which the simultaneous notification instruction is transmitted and a gate (a sluice gate/floodwall gate) to be closed according to the simultaneous notification instruction on the touch monitor 232.

The SAT-G-PLC unit 31 of the slave station 3 acquiring the simultaneous notification instruction transmits a control signal for activating the safety information dissemination facility (step S604). The slave station 3 can notify that the gate is closed in the vicinity of the gate by activating the safety information dissemination facility.

The control station 1 starts a timer after transmitting the simultaneous notification instruction to the SAT-G-PLC unit 31 of the slave station 3 and determines whether a predetermined time has elapsed from the transmission of the simultaneous notification instruction according to a countdown operation of the timer (step S605). A process of determining whether the predetermined time has elapsed in the countdown operation by the timer is similar to the process described with reference to FIG. 6.

When it is determined that the predetermined time has elapsed, the control station 1 transmits a control instruction for closing a gate (a sluice gate or a floodwall gate) to be closed to the SAT-G-PLC units 31 (step S606), and transmits the control signal to the control center 2 which manages the slave station 3 to which the control signal is transmitted (step S607). The simultaneous notification instruction and the control instruction are also transmitted to the control center 2, so that it is possible to monitor that the simultaneous notification instruction and the control instruction are transmitted from the control station 1 to the slave station 3.

The SAT-G-PLC unit 31 transmits a control instruction for closing the gate (the sluice gate or the floodwall gate) to be closed to each gate (step S608). That is, the gate is closed when a predetermined time has elapsed from the activation of the safety information dissemination facility.

In FIG. 11, the control station 1 transmits the simultaneous notification instruction to the slave station 3 when information of a J-ALERT is received as alert information based on emergency information via a communication satellite. It is possible to secure an evacuation time for the closing of the gate and control the gate by determining whether a predetermined condition of the predetermined time having elapsed from the transmission of the simultaneous notification instruction is satisfied and transmitting the control instruction for closing the gate to the slave station 3 when the predetermined time has elapsed.

The central simultaneous command monitoring device 115 of the control station 1 described with reference to FIG. 2 may be configured to acquire and monitor device information such as a closed state of the gate in the slave station 3 to which the simultaneous notification instruction is output. The device information may include, for example, a value of a water gauge, a sound collected by the microphone, and a video captured by a television camera, etc. installed in the gate as well as information about the opened/closed state of the gate. Also, the device information may include malfunction information for providing information on a malfunction of the device of the control center 2 or the slave station 3. In the present embodiment, in particular, gate information about whether the gate is correctly closed is important. For example, when a gate to be closed by the slave station 3 is not closed after the simultaneous notification instruction is transmitted, water may intrude into an embankment due to flooding from a tsunami or the like. The central simultaneous command monitoring device 115 can determine whether the gate is closed by monitoring information of a proximity sensor or the like installed in the gate through the slave station 3. The central simultaneous command monitoring device 115 transmits the acquired device information and the monitoring result to, for example, a monitoring terminal 12. The monitoring terminal 12 may display the transmitted device information and monitoring result on the monitor 127.

<Third Embodiment>

Next, the third embodiment will be described using FIG. 12.

The third embodiment is an embodiment in which the control station 1 performs a retry process of signal transmission of a simultaneous closing instruction in the automatic gate operation process of the first embodiment described with reference to FIGS. 6 and 7. FIG. 12 is a sequence diagram illustrating an example of the retry process of the signal transmission in a control station of the third embodiment.

Figure 12:
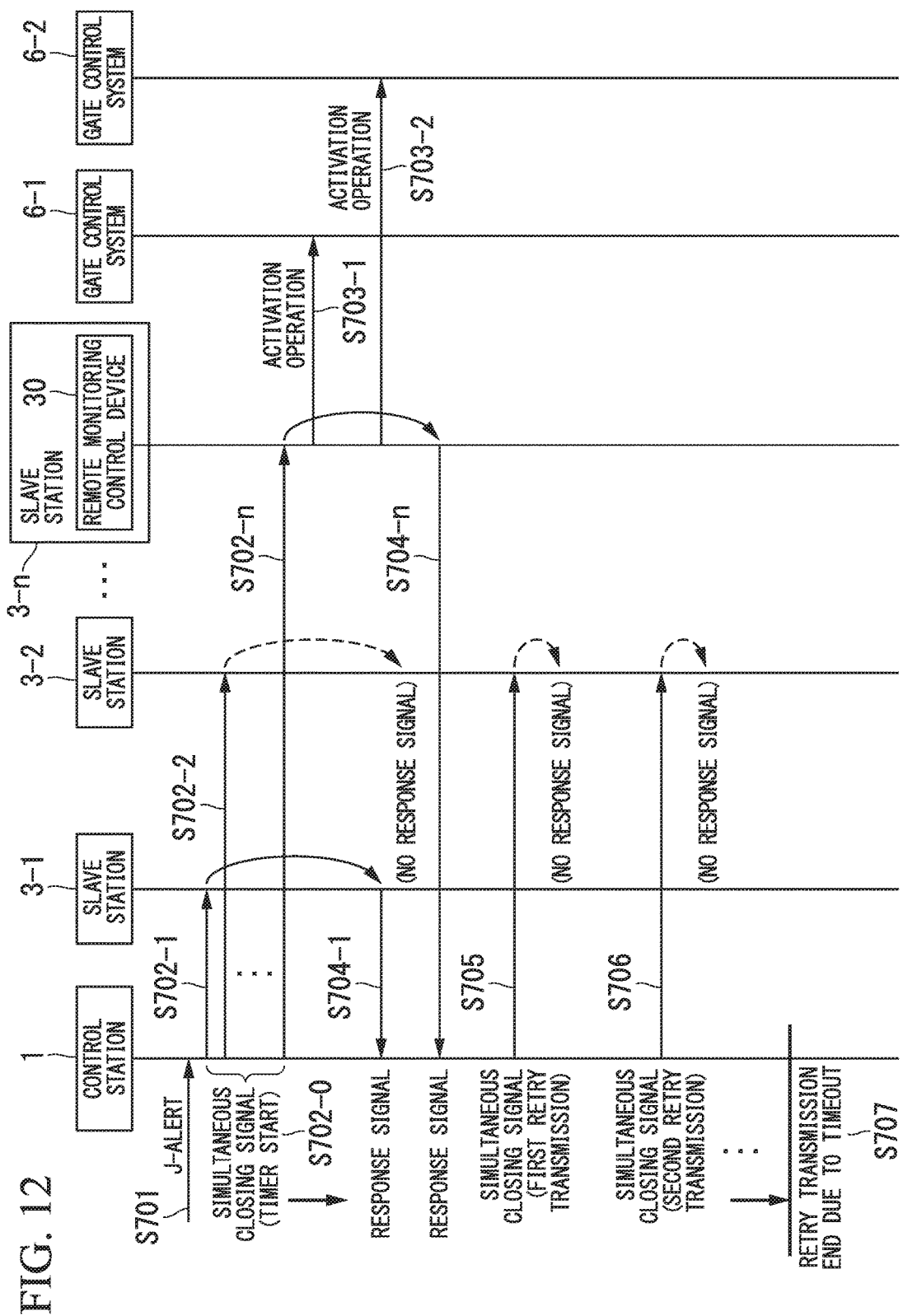
FIG. 12 is a sequence diagram illustrating an example of a retry process of signal transmission in a control station of a third embodiment.

In FIG. 12, the control station 1 receives a J-ALERT (step S701). The J-ALERT is assumed to be transmitted from a fire department 100 illustrated as a predetermined government office via a communication satellite. The control station 1 receiving the J-ALERT transmits activation information for activating the gate to the slave stations 3-1 to 3-n which are slave stations managed by the station itself on the basis of the content of the J-ALERT (steps S702-1 to S702-n). The activation information includes specification information for specifying a gate to be operated and operation information indicating operation content for the gate to be operated. In the present embodiment, the specification information indicates an example in which a simultaneous operation for specifying all gates to be operated is performed and the operation content indicates an example in which an operation of closing the gate is performed. That is, the control station 1 is assumed to transmit a simultaneous closing signal for simultaneously closing the gates as the activation information. The control station 1 simultaneously transmits the simultaneous closing signal to the slave stations 3-1 to 3-n using simultaneous communication of satellite communication. The control station 1 starts a timer when the simultaneous closing signal is transmitted (step S702-0). This timer is a time measurement means for measuring a timeout to be described below. The transmission of a simultaneous closing signal is performed via the satellite communication using the antenna device 10 described with reference to FIG. 2. Also, in FIG. 12, description of communication with the control center 2 having a communication frequency different from that of the simultaneous closing signal transmitted to the slave station 3 will be omitted. Details of the simultaneous closing signal will be described using FIG. 13.

Each of the remote monitoring control devices 30 of the slave stations 3-1 to 3-n receiving the simultaneous closing signal determines whether a gate that it is to operate is specified as an operation target among the specification information included in the simultaneous closing signal. Each slave station ignores (discards) the received simultaneous closing signal as it is when the gate that it is to operate is not specified as the operation target among the specification information. On the other hand, when the gate that the slave station is to operate is specified as the operation target among the specification information, the remote monitoring control device 30 of each station controls the activation (closing) of the gate (steps S703-1 and S703-2) and transmits an activation response signal to the control station 1 transmitting the activation information (steps S704-1 and S704-n). In FIG. 12, the slave station 3-1 and the slave station 3-n are shown to transmit activation response signals to the control station 1 and the slave station 3-2 is shown not to transmit the activation response signal to the control station 1.

The slave station 3-n has the function of the remote monitoring control device 30 connected to the gate control device 6-1 and the gate control device 6-2 described with reference to FIG. 4. To describe the above-mentioned operation in detail, the remote monitoring control device 30 confirms whether a gate to be operated by the gate control device 6-1 and the gate control device 6-2 is specified in specification information included in the simultaneous closing signal when the simultaneous closing signal is received. When it is confirmed that a gate to be operated by the gate control device 6-1 and the gate control device 6-2 is specified in specification information, the remote monitoring control device 30 transmits activation information for activating the broadcast facility and operation information for operating the gate to the gate control device 6-1 and the gate control device 6-2 (steps S703-1 and S703-2) and transmits the activation response signal to the control station 1 (steps S704-1 and S704-n). Also, because the internal configurations of the slave station 3-1 and the slave station 3-2 are similar to that of the slave station 3-n, description thereof will be omitted.

In FIG. 12, the slave station 3-2 does not transmit an activation response signal to the control station 1 (illustrated as "no response signal"). In the specification information included in the simultaneous closing signal, a gate to be operated by the slave station 3-2 is assumed to be specified. After the simultaneous closing signal is transmitted, the control station 1 can estimate when trouble occurs in satellite communication with the slave station in which the reception of the activation response signal is not confirmed even though a predetermined time has elapsed. Trouble in the satellite communication includes, for example, trouble in which repair or recovery is required due to a malfunction of hardware or software and temporary trouble due to a weather condition such as heavy rain or lightning. After the simultaneous closing signal is transmitted, the control station 1 retransmits the simultaneous closing signal (retry transmission) when a predetermined time has elapsed (steps S705, S706, etc.). The control station 1 can transmit the simultaneous closing signal to the slave station in which satellite communication is disabled due to temporary trouble by retransmitting the simultaneous closing signal.

The control station 1 performs an update operation of deleting a gate to be operated by the slave station transmitting the activation response signal to a transmitted first simultaneous closing signal from the specification information of the retransmitted simultaneous closing signal. Accordingly, the slave station transmitting the activation response signal to the transmitted first simultaneous closing signal ignores the simultaneous closing signal on the basis of the specification information of the retransmitted simultaneous closing signal, and therefore a load on signal processing is reduced.

After the simultaneous transmission signal is retransmitted in the process of step S705 (first retry transmission), the control station 1 retransmits the simultaneous transmission signal in the process of step S706 when a predetermined time has elapsed (second retry transmission). An update operation of deleting a gate to be operated by a slave station transmitting the activation response signal to the first retry transmission from the specification information is also performed in the second retry transmission. The control station 1 ends the retry transmission when activation response signals are received from all slave stations. It is possible to transmit a simultaneous closing signal to all slave stations in which satellite communication is temporarily disabled by the retry transmission process. On the other hand, the retry transmission also ends when a timeout time preset in the timer that started when the simultaneous closing signal was first transmitted has elapsed (step S707). The timeout time can be arbitrarily set. For example, the timeout time may be appropriately changed according to a weather state in which heavy rain or lightning occurs. For the slave station in which satellite communication is also disabled when the timeout time has elapsed, for example, a cause such as a malfunction of hardware is likely to have occurred. The control station 1 may be configured to display the slave station in which communication is disabled on the monitor 127 of FIG. 2. It is possible to reduce ineffective satellite communication by ending the retry transmission at the timeout time.

Also, a time interval until the retry transmission and the number of retries are arbitrary. Although the number of control stations 1 is one and the number of links of satellite communication is one in FIG. 12, the above-mentioned retry transmission method may change when the number of control stations 1 are two or more or when two links for satellite communication are used as described with reference to FIG. 1.

Figure 13:
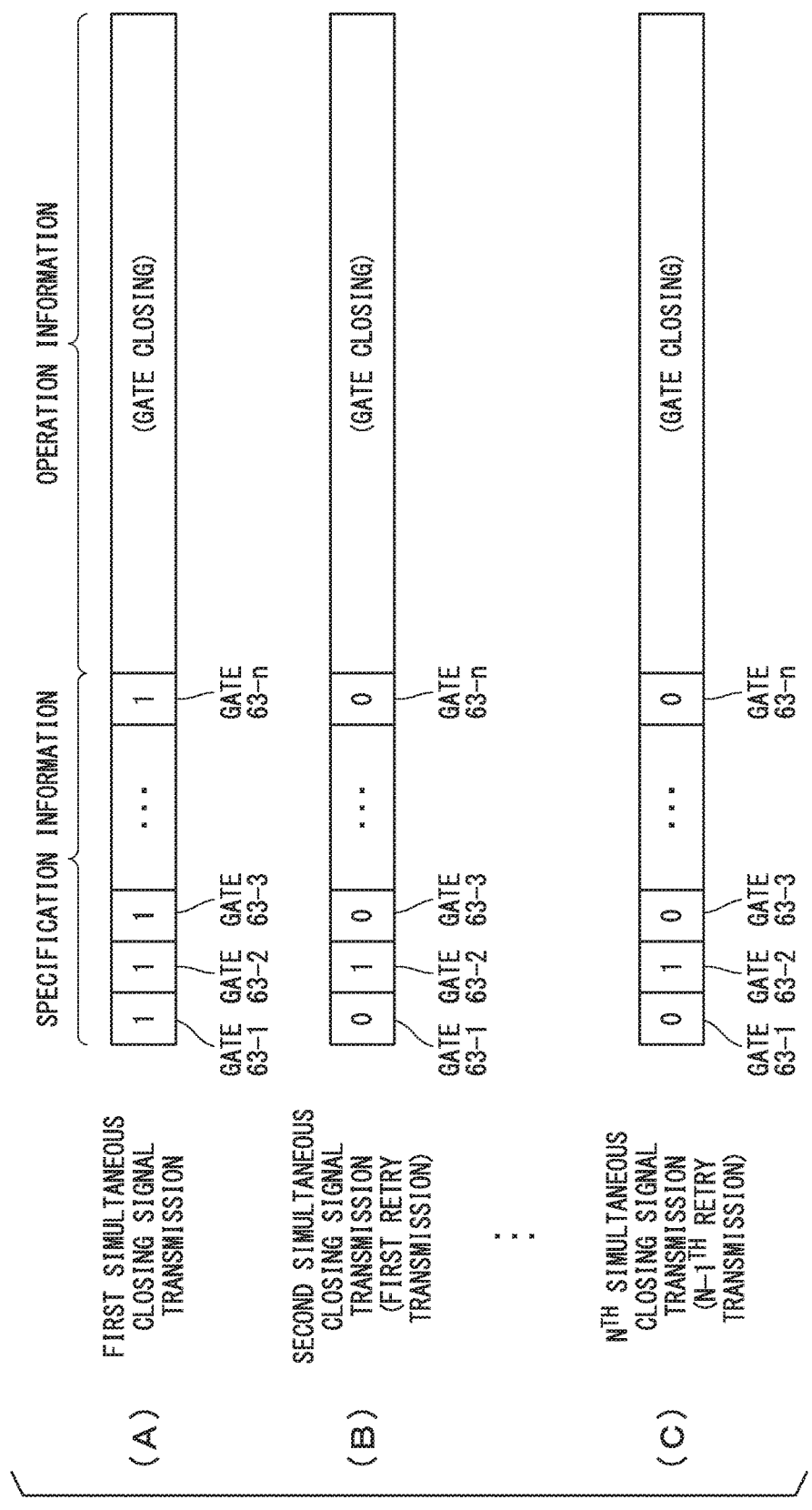
FIG. 13 is a diagram illustrating an example of an update of an operation signal to be transmitted in a retry process of a gate operation of the third embodiment.

Next, an update of specification information in retry transmission of a simultaneous closing signal will be described using FIG. 13. FIG. 13 is a diagram illustrating an example of an update of an operation signal to be transmitted in the retry process of a gate operation of the embodiment. FIGS. 13(A) to 13(C) illustrate the content of a simultaneous signal according to the number of retries.

FIG. 13(A) illustrates information of a simultaneous closing signal to be transmitted in first transmission. The simultaneous closing signal includes specification information for specifying a gate to be operated and operation information indicating operation content for the gate to be operated. In FIG. 13, a bit corresponding to each of n gates 63-1 to 63-$n$ is allocated to the specification information and the gate is specified by flags of bit units of "0" and "1." For example, as illustrated in (A), "1" is input to all bits corresponding to the gates 63-1 to 63-$n$ and all the gates 63-1 to 63-$n$ are specified.

The operation information includes information for closing gates. That is, the simultaneous closing signal is a gate control signal for operating gate closing specified by the operation information for a gate specified by the specification information. One slave station operates a plurality of gates. Therefore, a slave station receiving the simultaneous closing signal pre-stores a bit corresponding to a gate to be operated by the slave station. When the pre-stored bit is included in the specification information, the slave station transmits an operation response signal.

Also, the slave station may transmit the operation response signal to the control station 1 immediately after a simultaneous closing signal in which the gate to be operated by the slave station is specified is received and may transmit the operation response signal to the control station 1 after detecting the closing operation in the present embodiment. Also, the slave station may be configured to transmit the operation response signal to a gate detected to be being closed. Because the control station 1 retransmits a simultaneous closing signal to a gate from which the operation response signal is not received, it is desirable that information about whether the closing is operating is detected from each gate be included in the operation response signal as well. However, because the slave station can independently retry to close the gate as will be described below, a gate which does not receive the operation response signal may be included in the operation response signal.

FIG. 13(B) illustrates information of a simultaneous closing signal transmitted in the second transmission (first retry transmission (retransmission)). FIG. 13(B) illustrates that the operation response signal for the gate 63-2 to the simultaneous closing signal transmitted in the first transmission is not received and the gate 63-2 is specified by specification information in the simultaneous closing signal of the second transmission.

FIG. 13(C) illustrates information of the simultaneous closing signal transmitted in $n^{th}$ transmission (n−$1^{th}$ retry transmission). FIG. 13(C) illustrates that the operation response signal for the gate 63-2 to the simultaneous closing signal transmitted in each of second and subsequent transmissions is not received and the gate 63-2 is specified by specification information. That is, the control station 1 is shown to iterate the retry transmission until the operation response signal of the gate 63-2 is received.

Also, although the case in which the gate is specified by setting a flag of 1 or 0 in the bit unit for each gate in the specification information of FIG. 13 is shown, a data format of the specification information is arbitrary. For example, the gate may be specified by information other than the flag of the bit unit. For example, the specification information may include identification information for specifying the gate. Also, although the case in which one simultaneous closing signal is transmitted once has been described in the present embodiment, one simultaneous closing signal may be obtained by combining a plurality of signals or may be transmitted a plurality of times.

<Fourth Embodiment>

Next, the fourth embodiment will be described using FIG. 14.

An operation of a retry process when a control station transmits a simultaneous signal to control centers will be described in the fourth embodiment. FIG. 14 is a sequence diagram illustrating another example of the retry process of signal transmission in a control station of the fourth embodiment. Also, in FIG. 14, description of communication with a slave station 3 having a communication frequency different from that of the simultaneous closing signal transmitted to the control center 2 will be omitted.

Figure 14:
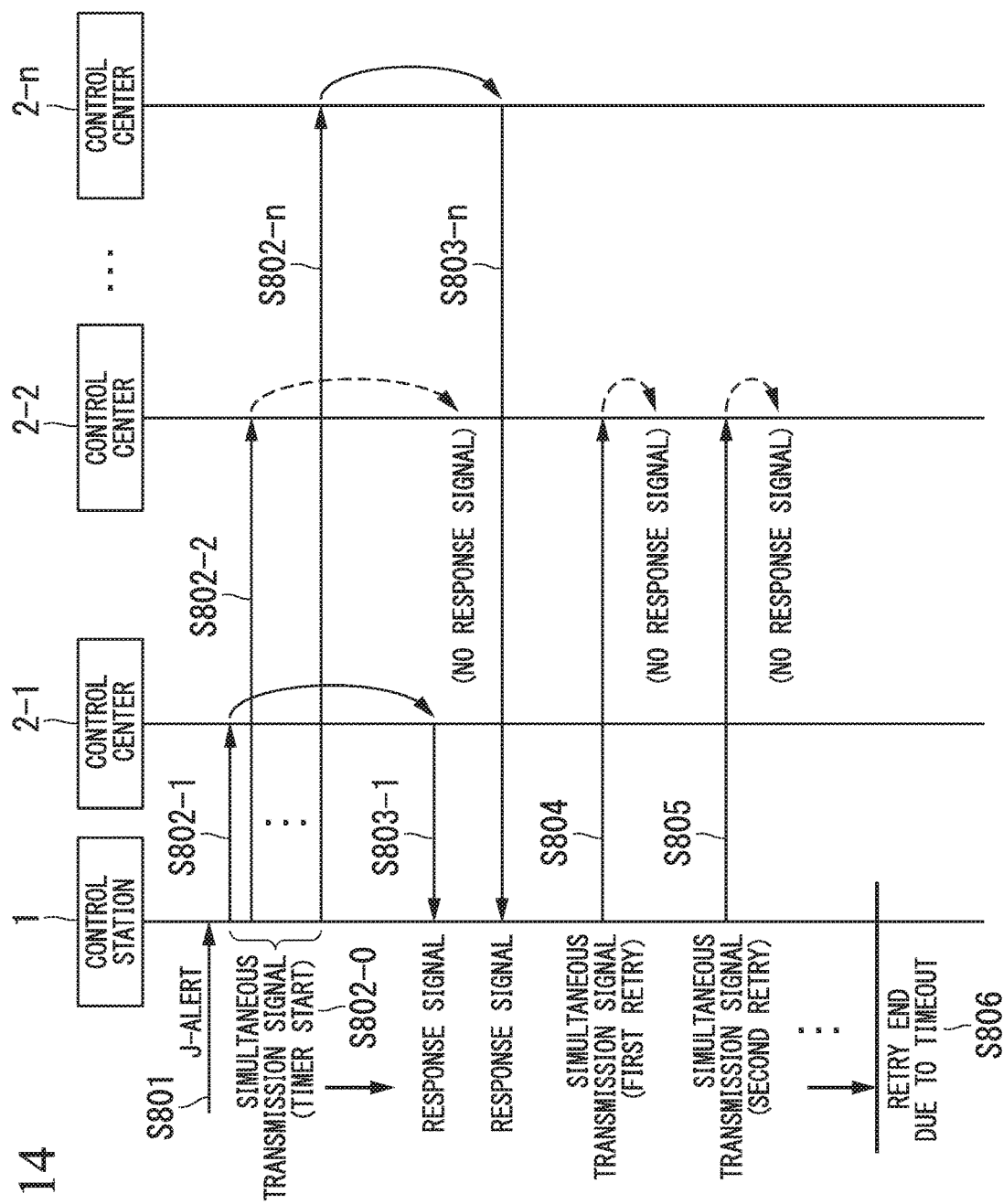
FIG. 14 is a sequence diagram illustrating another example of a retry process of signal transmission in a control station of a fourth embodiment.

In FIG. 14, the control station 1 receives a J-ALERT as in FIG. 12 (step S801). The control station 1 receiving the J-ALERT simultaneously transmits predetermined information to control centers 2-1 to 2-$n$ managed by the control station 1 on the basis of content of the J-ALERT (steps S802-1 to S802-$n$). A transmission signal includes specification information for specifying the control centers and transmission information indicating content of transmitted information. In the present embodiment, the specification information is assumed to specify all the control centers managed by the control station 1 and the operation content is assumed to have text information indicating a manual operation of closing the gate. The control station 1 starts a timer when a simultaneous transmission signal is transmitted (step S802-0). The timer is a time measuring means for measuring a timeout as in FIG. 12. The transmission of the simultaneous transmission signal is performed via the satellite communication using the antenna device 10 described with reference to FIG. 2.

Each of the control centers 2-1 and 2-$n$ receiving the simultaneous transmission signal determines whether the center itself is specified in the specification information included in the simultaneous transmission signal. Each control center ignores the received simultaneous transmission signal as it is when the center itself is not specified in the specification information. On the other hand, when the center itself is specified in the specification information, each control center provides a notification to an operator so that the gate is manually closed and transmits a response signal to the control station 1 transmitting the simultaneous transmission signal (steps S803-1 to S803-$n$). As illustrated in FIG. 14, the control center 2-1 and the control center 2-$n$ transmit response signals to the control station 1 and the control center 2-2 does not transmit the response signal to the control station 1.

After the simultaneous transmission signal is transmitted, the control station 1 can estimate whether trouble occurs in satellite communication with the control center in which the reception of the response signal is not confirmed even though a predetermined time has elapsed. Trouble in the satellite communication includes trouble in which the repair or recovery is required and temporary trouble as described with reference to FIG. 12. After the simultaneous transmission signal is transmitted, the control station 1 retransmits the simultaneous transmission signal when a predetermined time has elapsed (retry transmission) (steps S804). The control station 1 can transmit the simultaneous closing signal to the control center in which satellite communication is disabled due to temporary trouble by retransmitting the simultaneous transmission signal.

The control station 1 performs an update operation of deleting the control center transmitting the response signal to a transmitted first simultaneous transmission signal from the specification information of the retransmitted simultaneous transmission signal in the process of step S804. Accordingly, the control center (for example, the control center 2-1) transmitting the response signal to the transmitted first simultaneous transmission signal ignores the simultaneous transmission signal on the basis of the specification information of the retransmitted simultaneous transmission signal, and therefore a load on signal processing is reduced.

After the simultaneous transmission signal is retransmitted (first retry transmission), the control station 1 retransmits the simultaneous transmission signal when a predetermined time has elapsed (second retry transmission) (step S805). An update operation of deleting a control center transmitting the response signal to the first retry transmission from the specification information is also performed in the second retry transmission. The control station 1 ends the retry transmission when response signals are received from all control centers. It is possible to transmit a simultaneous transmission signal to all the control centers in which satellite communication is temporarily disabled by the retry transmission process. On the other hand, the retry transmission also ends when a timeout time preset in the timer that started when the simultaneous transmission signal was first transmitted has elapsed (step S806). The timeout time can be arbitrary set. The control station 1 may be configured to display the control center in which communication is disabled on the monitor 127 of FIG. 2. It is possible to reduce ineffective satellite communication by ending the retry transmission at the timeout time.

Figure 15:
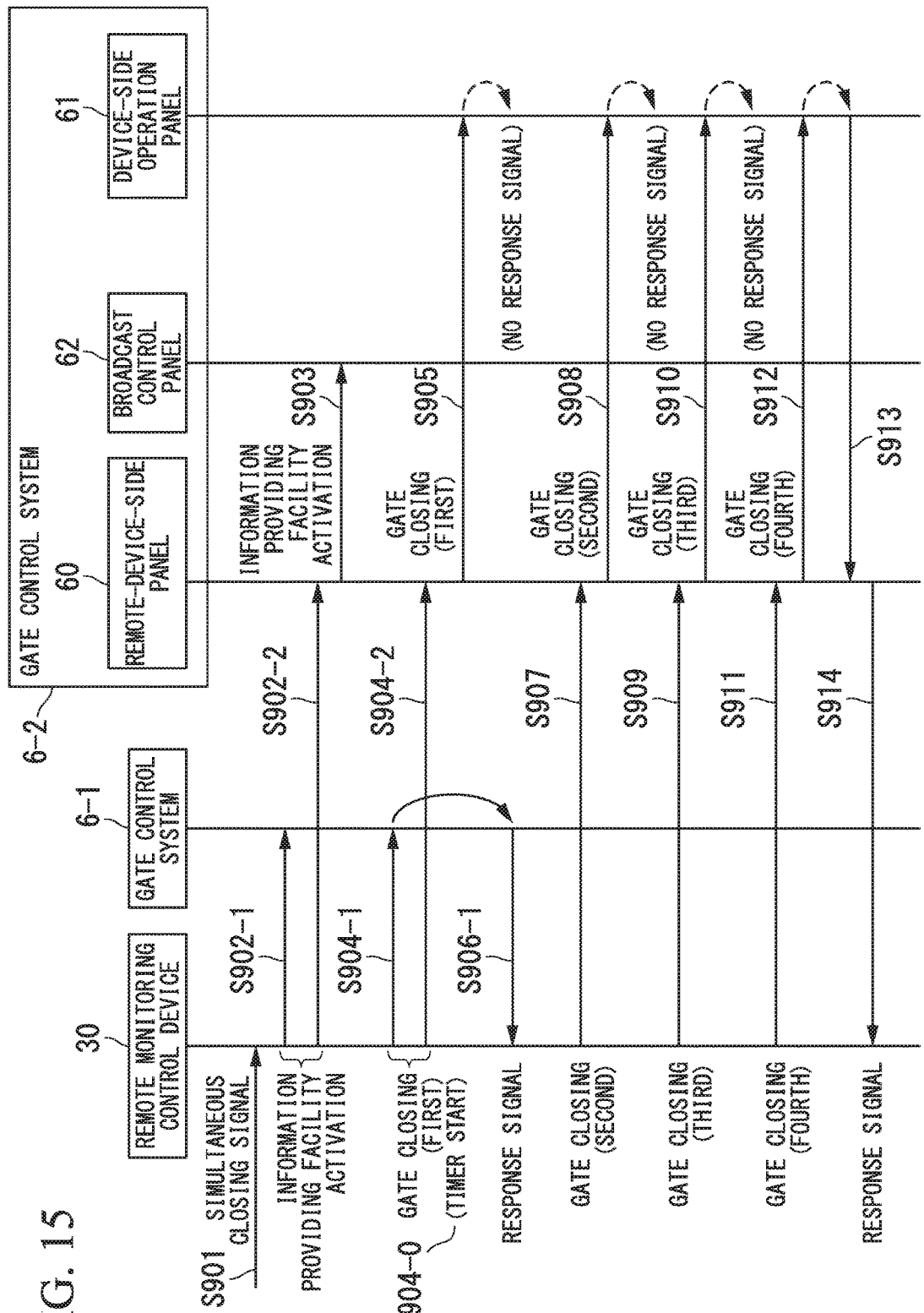
FIG. 15 is a sequence diagram illustrating an example of a retry process of gate closing in a slave station of the fourth embodiment.

Next, a retry process in a slave station (a slave station system) receiving a simultaneous closing signal will be described using FIG. 15. FIG. 15 is a sequence diagram illustrating an example of the retry process of the gate closing in the slave station of the fourth embodiment. The slave station illustrated in FIG. 15 includes the remote monitoring control device 30 and the gate control device 6 described with reference to FIG. 5. In FIG. 15, an example in which a gate control device 6-1 and a gate control device 6-2 are provided as the gate control device 6 is illustrated. Each of the gate control device 6-1 and the gate control device 6-2 includes a remote-device-side panel 60, a broadcast control panel 62, and a device-side operation panel 61. Also, the illustration of the remote-device-side panel 60, the broadcast control panel 62, and the device-side operation panel 61 in the gate control device 6-1 is omitted.

In FIG. 15, the remote monitoring control device 30 receives a simultaneous closing signal from a control station 1 (not illustrated) (step S901). The remote monitoring control device 30 receiving the simultaneous closing signal transmits an activation signal for activating a safety information dissemination facility to the remote-device-side panel 60 of the gate control device 6-1 and the gate control device 6-2 managed by the remote monitoring control device 30 on the basis of content of the simultaneous closing signal (steps S902-1 and S902-2). The activation signal is assumed to include the activated safety information dissemination facility and content of provided information.

The remote-device-side panel 60 receiving the activation signal from the remote monitoring control device 30 transmits the activation signal for activating the safety information dissemination facility to the broadcast control panel 62 (step S903). The safety information dissemination facility includes, for example, the speakers 56, the sound collecting microphones 57, the siren sound collecting microphone 58, or the electric display board 59 described with reference to FIG. 4, or the like. The activation signal transmitted by the remote-device-side panel 60 includes, for example, information for designating content of a sound output from the speakers 56 or text information displayed on the electric display board 59.

The remote monitoring control device 30 confirms that a predetermined time has elapsed after transmitting the activation signal and transmits a first closing signal for closing the gate to the remote-device-side panel 60 of the gate control device 6-1 and the gate control device 6-2 (steps S904-1 and S904-2). The closing signal transmitted by the remote monitoring control device 30 includes, for example, specification information for specifying the gate to be closed (the device-side operation panel 61) and transmission information indicating a closing operation on the gate. The specification information may include the gate control device 6-1. In the process of step S904, the remote monitoring control device 30 can include a flag indicating a predetermined level in the closing signal. The level of the flag will be described below. The remote monitoring control device 30 starts a timer when the closing signal is transmitted (step S904-0). This timer is a time measurement means for measuring a timeout to be described below.

The remote-device-side panel 60 receiving the closing signal transmits a first closing signal to the device-side operation panel 61 (step S905). The closing signal transmitted by the remote-device-side panel 60 includes information indicating a predetermined level transmitted from the remote monitoring control device 30. Information indicating the predetermined level is, for example, added by adding a flag to a predetermined bit of the closing signal according to the number of transmissions. Here, information about the level included in the closing signal will be described.

The information about the level included in the closing signal is a level changed according to urgency of opening/closing the gate, a malfunction level of the gate, or the like. The use of information about the level is arbitrary. In the present embodiment, an example in which means for closing the gate is changed by changing the level is shown.

As described with reference to FIG. 4, the device-side operation panel 61 is configured to be able to use three closing means of a gate motor drive, a pneumatic drive, and a drive using gravity to close the gate. The device-side operation panel 61 changes the closing means according to information about the level according to the number of transmissions of the closing signal. The number of transmissions of the closing signal is updated by the retransmission of the closing signal. The closing signal is retransmitted when any trouble occurs in the closing of the gate. For example, when the gate is in the closing operation even though a predetermined time has elapsed from the transmission of the closing signal, the device-side operation panel 61 transmits a response signal indicating that the gate is in the closing operation to the remote monitoring control device 30 (step S906-1). On the other hand, when the gate is not in the closing operation even though the predetermined time has elapsed from the transmission of the closing signal, the device-side operation panel 61 does not transmit the response signal indicating that the gate is in the closing operation to the remote monitoring control device 30. When information indicating that the gate is in the closing operation cannot be received, it is estimated that trouble occurs in the closing of the gate and the remote monitoring control device 30 retransmits a closing signal (step S907). The remote monitoring control device 30 retransmits a closing signal in which the level is changed according to the number of transmissions (retry). The remote monitoring control device 30 iterates the retransmission until it is detected that the gate is in the closing operation.

For example, the remote monitoring control device 30 in the process of step S904 transmits a first closing signal including a flag of a first level to the remote-device-side panel 60 (step S905). The device-side operation panel 61 closes the gates using the motor drive on the basis of importance of the first level when the first closing signal is received from the remote monitoring control device 30. The first level is information when the gate can perform a normal closing operation.

The device-side operation panel 61 confirms whether the gate is in the closing operation after the closing of the gate starts and transmits a response signal to the remote-device-side panel 60 when it is confirmed that the gate is in the closing operation. The fact that the gate is in the closing operation can be detected by a sensor or the like which detects a position of the gate. For example, when the gate gradually moves from an opened state to a closed state, the sensor which detects the position of the gate may be a movement start detection sensor which detects that the gate has started to move from the opened state, a movement completion detection sensor which detects that the gate has completely moved to the closed state, or a combination of the movement start detection sensor and the movement completion detection sensor. When the sensor which detects the position of the gate is the combination of the movement start detection sensor and the movement completion detection sensor, the device-side operation panel 61 may be configured to detect that the gate is in the closing operation when the movement start detection sensor detects the movement of the gate within a first time after the closing of the gate starts and the movement completion detection sensor detects the movement of the gate within a second time which is longer than the first time after the closing of the gate starts. The remote-device-side panel 60 transmits the response signal received from the device-side operation panel 61 to the remote monitoring control device 30.

On the other hand, when it is not confirmed that the gate is in the closing operation after the closing of the gate starts, the device-side operation panel 61 does not transmit the response signal to the remote-device-side panel 60. FIG. 15 illustrates that the device-side operation panel 61 of the gate control device 6-2 does not transmit the response signal.

The remote monitoring control device 30 transmits a second closing signal (a first retry signal) including a flag of a second level to the remote-device-side panel 60 when a signal indicating that the closing operation is not received from the device-side operation panel 61 even though a predetermined time has elapsed after the first closing signal is transmitted (step S907) and the remote-device-side panel 60 transmits the second closing signal including the flag of the second level to the device-side operation panel 61 (step S908). The device-side operation panel 61 closes the gate by reusing the motor drive on the basis of the second level when the second closing signal is received from the remote-device-side panel 60 (the retry of the motor drive). For example, when there is minor trouble such as an increase in the opening/closing load due to rust or the like attached to the gate, the gate may operate due to the motor drive again. The second level is information for coping with trouble of a level capable of being solved in the retry of the motor drive.

Also, the second closing signal may be transmitted at a time interval differing according to each gate after the first closing signal is transmitted. The timing at which the gate can be detected to be in the closing operation may differ according to each gate in terms of a position of a sensor, a speed at which the gate is closed, a movement distance of the gate until the gate can be detected to be in the closing operation, or the like. Accordingly, it is desirable that the second closing signal be appropriately set for each gate according to the timing at which the gate can be detected to be in the closing operation. The same is true for a third closing signal or a closing signal to be transmitted after the third closing signal to be described below.

The remote monitoring control device 30 performs an update operation of deleting a gate (the device-side operation panel 61) to be operated by the gate control system transmitting a response signal to a transmitted first closing signal from the specification information of the retransmitted closing signal. Accordingly, the gate control system transmitting the response signal to the transmitted first closing signal reduces the load of the signal processing by ignoring the closing signal on the basis of the specification information of the retransmitted closing signal.

The remote monitoring control device 30 transmits a third closing signal (a second retry signal) including a flag of a third level to the remote-device-side panel 60 when a signal indicating the closing operation is not received from the device-side operation panel 61 even though a predetermined time has elapsed after the second closing signal is transmitted (step S909) and the remote-device-side panel 60 transmits the third closing signal including the flag of the third level to the device-side operation panel 61 (step S910). An update operation of deleting a gate to be operated by the gate control system transmitting the response signal to the transmission of the second closing signal from the specification information is also performed in the transmission of the third closing signal.

The device-side operation panel 61 closes the gate using the pneumatic drive on the basis of the third level when the third closing signal is received from the remote-device-side panel 60. The pneumatic drive may be used together with the motor drive. For example, in the case of trouble of a moderate level such as a malfunction of a motor, the gate is closed in a method of replacing the drive with the motor drive. In the present embodiment, an example in which the pneumatic drive is used in place of the motor drive is shown. The third level is information for coping with trouble of a level at which the gate can be closed by the pneumatic drive in place of the motor drive.

The remote monitoring control device 30 transmits a fourth closing signal (a third retry signal) including a flag of a fourth level to the remote-device-side panel 60 when a signal indicating the closing operation is not received from the device-side operation panel 61 even though a predetermined time has elapsed after the third closing signal is transmitted (step S911) and the remote-device-side panel 60 transmits the fourth closing signal including the flag of the fourth level to the device-side operation panel 61 (step S912). An update operation of deleting a gate to be operated by the gate control system transmitting the response signal to the transmission of the third closing signal from the specification information is also performed in the transmission of the fourth closing signal.

The device-side operation panel 61 closes the gate using the drive using gravity on the basis of the fourth level when the fourth closing signal is received from the remote-device-side panel 60. The drive using gravity may be used together with the motor drive or the pneumatic drive. For example, in the case of trouble such as a malfunction of a motor or an actuator of a cylinder, the gate is closed in a method of replacing the drive with actuator drive. In the present embodiment, an example in which gravity is used on the gate in place of the actuator drive is shown. The fourth level is information for coping with trouble of a level at which the gate can be automatically closed in place of the actuator drive.

The remote monitoring control device 30 ends the transmission of the closing signal when response signals are received from all gate control systems (step S914). The remote monitoring control device 30 enables the operation of the gate or the like according to the level of the trouble by transmitting a closing signal in which a flag indicating importance is changed.

On the other hand, the transmission of the closing signal also ends when a timeout time preset in the timer that started when the closing signal was first transmitted has elapsed. The timeout time can be arbitrarily set. In the gate control system which does not transmit the response signal even though the timeout time has elapsed, for example, a cause such as a malfunction of a gate is likely to have occurred. The remote monitoring control device 30 may be configured so that a gate control system which does not transmit the response signal is displayed on the monitor 127 of FIG. 1. It is possible to reduce ineffective communication by ending the transmission of the closing signal at the timeout time.

Also, the time interval at which the closing signal is transmitted and the number of transmissions are arbitrary. Although the case in which the number of remote monitoring control devices 30 is one and the number of gate control systems is two has been described in FIG. 15, a configuration of a slave-station system is not limited thereto.

Also, although the case in which the gate is closed by means such as a motor drive has been described in the present embodiment, the means for closing the gate is not limited thereto. For example, means such as switching the power supply to a preliminary battery to close the gate may be used. Also, the number of level steps may be a number other than 4. Also, although the case in which information indicating a level is included in the closing signal and the means for closing the gate according to the importance is changed has been described in the present embodiment, the level may be used to change notification information of a broadcast, an alert, display, or the like.

According to at least one embodiment described above, the control station of the embodiment is a control station of a gate control system which includes control stations and slave stations and controls operations of gates, the control station including an information acquisition unit and a control information transmission unit, thereby securing an evacuation time and controlling a gate to be closed.

Several embodiments according to the invention have been described, but these embodiments are presented as examples, which are not intended to limit the scope of the invention. These novel embodiments can be implemented in various other forms, and various omissions, substitutions, and changes can be made in a scope not departing from the spirit of the invention. These embodiments and the modifications are included in the scope or spirit of the invention, and also in the equivalent scope of claims of the invention.

What is claimed is:

1. A slave station of a gate control system which comprises a control station, control centers, and other slave stations and which controls operations of gates, the slave station comprising:
   a receiver configured to receive gate control information for controlling at least an associated gate of the gates from control stations via satellite communication, the gate control information having been simultaneously transmitted from the control stations to the slave station and the other slave stations in the gate control system; and
   a gate controller configured to generate a signal for notifications for closing the gates when the gate control information is received by the receiver, the gate controller being configured to control the gates to be closed when a time has elapsed from transmission of the gate control information by the control station.

2. The slave station according to claim 1,
   wherein the gate controller is configured to generate the signal for notifications for closing the gates when the receiver receives the signal for controlling the notification, and
   wherein the gate controller is configured to control the gates to be closed when a time has elapsed from transmission of the notification signal by the control station.

3. The slave station according to claim 2,
   wherein the receiver is configured to receive the gate control information for controlling the gates to be closed, where the gate control information was transmitted by the control station when the time has elapsed from transmission of the notification signal by the control station, and
   wherein the gate controller is configured to control the gates to be closed when the gate control information is received by the receiver.

4. The slave station according to claim 2, wherein the gate controller is configured to transmit a closing signal of a level for closing a gate to a device which operates the gates, the gate controller is configured to transmit the closing signal in which the gate controller updates the level when the slave station receives no response from the device to the closing signal transmitted by the gate controller.

5. A method of controlling a slave station of a gate control system which comprises a control station, control centers, and other slave stations and which controls operations of gates, the method comprising:
receiving gate control information for controlling at least an associated gate of the gates from control stations via satellite communication, the gate control information having been simultaneously transmitted from the control stations to the slave station and the other slave stations in the gate control system;
generating a signal for notifications for closing the gates when the gate control information is received by the receiver; and
controlling the gates to be closed when a time has elapsed from transmission of the gate control information by the control station.

6. The method according to claim 5,
wherein generating the signal for notifications for closing the gates comprises generating the signal for notifications for closing the gates when the receiver receives the signal for controlling the notification, and
wherein controlling the gates to be closed comprises controlling the gates to be closed when a time has elapsed from transmission of the notification signal by the control station.

7. The method according to claim 6,
wherein receiving the gate control information comprises receiving the gate control information for controlling the gates to be closed, where the gate control information was transmitted by the control station when the time has elapsed from transmission of the notification signal by the control station, and
wherein controlling the gates to be closed comprises controlling the gates to be closed when the gate control information is received by the receiver.

8. The method according to claim 6, wherein controlling the gates to be closed further comprises transmitting a closing signal of a level for closing a gate to a device which operates the gates, where the level is updated when the slave station receives no response from the device to the closing signal transmitted.

9. A gate control system comprising:
a control station; and
a plurality of slave stations configured to control gate operations,
wherein the control station comprises:
an information acquisitor configured to acquire emergency information via satellite communication; and
a control information transmitter configured to simultaneously transmit gate control information to the plurality of slave stations via the satellite communication based on the emergency information, and
wherein each of the plurality of slave stations comprises:
a receiver configured to receive the gate control information which has been simultaneously transmitted from the control station; and
a gate controller configured to activate, based on the gate control information, a safety information dissemination facility to provide a notification that the gate is to be closed and, after a first time has elapsed from activating the safety information dissemination facility, to control the gate to be closed.

10. The gate control system according to claim 9, wherein the gate control information comprises:
a simultaneous notification instruction for activating the safety information dissemination facility; and
a simultaneous closing instruction to be transmitted when a second time has elapsed from transmitting the simultaneous notification instruction for controlling the gate to be closed, and
wherein the gate controller is configured to activate the safety information dissemination facility when the receiver receives the simultaneous notification instruction, and
wherein the gate controller is configured to control the gate to be closed when the receiver receives the simultaneous closing instruction.

11. The gate control system according to claim 9, wherein the control station further comprises:
an operation response signal receiver configured to receive a respective response signal to the gate control information from each of the plurality of slave stations through the satellite communication,
wherein the control information transmitter is configured to recognize a respective state of each of the gates based on whether the operation response signal receiver received the operation response signal from each of the plurality of slave stations, and
wherein the control information transmitter is configured to re-transmit the gate control information to the slave station from which the operation response signal receiver has not received the operation response signal.

12. The gate control system according to claim 9, further comprising:
a control center configured to manage the gates that are connected to the slave stations,
wherein the control center comprises:
a display device configured to display information of an opened/closed state of each of the gates managed by the control center; and
a transmitter configured to simultaneously transmit, based on the opened/closed state, a closing instruction for one or more of the plurality of slave stations to the plurality of slave stations through the control station.

13. A control station comprising:
an information acquisitor configured to acquire emergency information via satellite communication; and
a control information transmitter configured to simultaneously transmit gate control information to a plurality of slave stations via the satellite communication based on the emergency information, and
an operation response signal receiver configured to receive a respective response signal to the gate control information from each of the plurality of slave stations through the satellite communication,
wherein the control information transmitter is configured to recognize a respective state of each of the gates based on whether the operation response signal receiver received the operation response signal from each of the plurality of slave stations, and
wherein the control information transmitter is configured to re-transmit the gate control information to the slave station from which the operation response signal receiver has not received the operation response signal.

14. The control station according to claim 13, wherein the gate control information comprises:
- a simultaneous notification instruction for activating the safety information dissemination facility; and
- a simultaneous closing instruction to be transmitted when a second time has elapsed from transmitting the simultaneous notification instruction for controlling the gate to be closed, and
- wherein the gate controller is configured to activate the safety information dissemination facility when the receiver receives the simultaneous notification instruction, and
- wherein the gate controller is configured to control the gate to be closed when the receiver receives the simultaneous closing instruction.

15. The control station according to claim 13, wherein the control station further comprises:
- an operation response signal receiver configured to receive a respective response signal to the gate control information from each of the plurality of slave stations through the satellite communication,
- wherein the control information transmitter is configured to recognize a respective state of each of the gates based on whether the operation response signal receiver received the operation response signal from each of the plurality of slave stations, and
- wherein the control information transmitter is configured to re-transmit the gate control information to the slave station from which the operation response signal receiver has not received the operation response signal.

* * * * *